(12) United States Patent
Dorris, Jr. et al.

(10) Patent No.: US 12,131,346 B2
(45) Date of Patent: Oct. 29, 2024

(54) COMPUTER-IMPLEMENTED SYSTEMS AND METHODS FOR TRACKING USER ACTIVITY AND MANAGING QUESTS

(71) Applicant: POARCH BAND OF CREEK INDIANS, Atmore, AL (US)

(72) Inventors: James F. Dorris, Jr., Spanish Fort, AL (US); Kenneth William Rohman, III, Gulf Shores, AL (US); Brian Franklin Bell, Walnut Hill, FL (US); Peter Anderson, Northbrook, IL (US); Ronald E. Nesbitt, Montgomery, AL (US); Peter A. Connelly, Seattle, WA (US)

(73) Assignee: POARCH BAND OF CREEK INDIANS, Atmore, AL (US)

( * ) Notice: Subject to any disclaimer, the term of this patent is extended or adjusted under 35 U.S.C. 154(b) by 0 days.

(21) Appl. No.: 17/813,886

(22) Filed: Jul. 20, 2022

(65) Prior Publication Data
US 2023/0048477 A1    Feb. 16, 2023

Related U.S. Application Data

(60) Provisional application No. 63/224,393, filed on Jul. 21, 2021.

(51) Int. Cl.
*G06Q 30/02* (2023.01)
*G06Q 30/0207* (2023.01)

(52) U.S. Cl.
CPC .............. *G06Q 30/0209* (2013.01)

(58) Field of Classification Search
CPC ........... G06Q 30/0209; G06Q 20/4012; G06Q 20/3224
See application file for complete search history.

(56) References Cited

U.S. PATENT DOCUMENTS 10,022,632 B1* 7/2018 McAdoo ............... G06Q 30/06
2008/0097839 A1* 4/2008 Koren ............... G06Q 30/0251
705/14.1

(Continued)

OTHER PUBLICATIONS

Ahsan Manzoor, Mika Ylianttila, Scavenger Hunt: Utilization of Blockchain and IoT for a Location-Based Game, 2020, IEEE Access, vol. 8 (Year: 2020).*

(Continued)

*Primary Examiner* — E Carvalho
(74) *Attorney, Agent, or Firm* — FINNEGAN, HENDERSON, FARABOW, GARRETT & DUNNER LLP

(57) ABSTRACT

Computer-implemented systems and methods are provided for tracking user activity and managing quests. By way of example, a method may include receiving, from a website server, first identity data representing an identity of a user and data identifying a quest activated by the user, the quest comprising one or more activities to be performed at a physical location, and receiving, from at least one reporting device, second identity data representing the identity of the user at the physical location, and activity tracking data in response to the user performing an activity associated with the quest at the physical location. The method may also include identifying the user and the quest activated by the user based on the first identity data and data identifying the quest, further identifying the user and activity data related to the quest based on the second identity data and activity tracking data, and monitoring a progress of the user.

31 Claims, 9 Drawing Sheets

(56) References Cited

U.S. PATENT DOCUMENTS

| | | | | |
|---|---|---|---|---|
| 2014/0323216 A1* | 10/2014 | Kim | ........................ | G07F 17/32 463/31 |
| 2015/0174481 A1* | 6/2015 | Tobin | ...................... | A63F 13/65 463/7 |
| 2019/0340871 A1* | 11/2019 | Miri | ...................... | G07F 17/323 |
| 2021/0192894 A1* | 6/2021 | Higgins | .............. | G07F 17/3206 |

OTHER PUBLICATIONS

Anton Eklund, Axel Nygards, David Smeds, Mobile Game for Motivating Physical Activity using Gamification and Augmented Reality, Jul. 5, 2018, Uppsala University (Year: 2018).*

\* cited by examiner

Add Quest — 601

- 603 (Name field)
- Name:
- Type: ○ Points 605a  ○ Spins 605b  ○ Wins 605c
- Amount: 607

Locations: — 611
▷ Any
- WCA
- WCM
- WCW
- WCB

Days: — 609
▷ Any
- Sun
- Mon
- Tues
- Wed
- Thurs
- Fri
- Sat

Games: — 613
○ Any Game  ○ Select Games

| Icon | ID | Casino ID | Name |
|------|------|-----------|------|
|      |      |           |      |
|      | 01019 | ACC | MULTI WIN |
|      | 01022 | ACC | DRAGON FISH |
|      | 01023 | ACC | GOLD LION TRIPLE SHOT |
|      | 01024 | ACC | MONEY HEAT |
|      | 01025 | ACC | MUSTANG MONEY |
|      | 01028 | ACC | ROAMING REELS |

Previous — 617b  Page 1 of 473  20 rows ▾  Next — 617a

615 / 617c

Please upload Image — 619

ADD — 621    CANCEL — 623

COMPUTER-IMPLEMENTED SYSTEMS AND METHODS FOR TRACKING USER ACTIVITY AND MANAGING QUESTS

CROSS REFERENCE TO RELATED APPLICATION(S)

This application claims priority to U.S. Provisional Application No. 63/224,393, filed Jul. 21, 2021, the contents of which is hereby incorporated by reference in its entirety.

TECHNICAL FIELD

The present disclosure generally relates to the field of computing systems and data processing systems and methods. More specifically, and without limitation, this disclosure relates to computer-implemented systems and methods for tracking and managing user activity. The systems and methods disclosed herein may be used in various applications, including applications where a user's activity is tracked at one or more physical locations, at one or more online locations, and/or by using different reporting devices. The systems and methods disclosed herein also relate to applications for managing quests, each quest defining one or more activities to be monitored over time.

BACKGROUND

Data tracking and management systems are used to collect data and store and manage the collected data. A variety of computing and data processing components may be used to evaluate and process collected data. However, extant systems may only support a finite set of data processing operations or functions. Further, some extant systems may only be programmed or reconfigured by highly trained software developers or data scientists. Such features limit the use or flexibility of the system and/or increase the cost of tracking and managing data over time.

There are various data input and tracking devices. Such devices may be individually implemented or accessible via a communication network. For example, such devices include a website server, a social media application, a mobile phone, a magnetic card reader, a contactless chip reader, a network video camera, and an electronic sensor. In many extant systems, specific types of data collecting devices are typically utilized for specific types of data or operations to be performed. Such systems may not integrate data from different sources or across different operating systems or platforms. This may be due to data incompatibility or the lack of interconnectivity. Still further, localized devices may not share information or have limited or no capabilities to process data. In addition to restricting the operations and flexibility of the system, such limitations can impose challenges, such as the ability to authenticate data or track activity between different operating environments and/or across different physical locations.

In view of the foregoing drawbacks and technical challenges, there is a need for improved computing and data processing systems. For example, there is a need for computer-implemented systems and methods for tracking user activity at one or more physical locations, at one or more online locations, and/or by using different reporting devices. There is also a need for such systems and methods that can be used over a wide range of applications and/or with the ability to be adapted or (re)programmed without the need for complex programming or data engineering skills. The inventors of the present disclosure have also identified a need for a flexible, computer-implemented system and method for managing quests, each quest including one or more activities monitored over time.

SUMMARY

Consistent with embodiments of the present disclosure, systems, methods, and non-transitory computer-readable media are provided for tracking user activity at one or more physical locations by using one or more different reporting devices, and/or at one or more online locations by using one or more servers or other reporting devices. The reporting devices may be interconnected and/or communicatively coupled to a data integration server. Embodiments of the present disclosure also relate to systems and methods that can be used over a wide range of applications, including applications where a quest is obtained online by a user, and activities related to the quest are tracked and monitored over time while they are performed by the user. A quest may include activities to be performed at one or more physical locations and/or at one or more online locations. For example, a quest may include activities to be performed at a physical location (such as a hotel or retail store). As a further example, a quest may include activities to be performed at a physical location and/or activities to be performed online (such as at a website). The quests may be configured by an administrator and vary over time. In some implementations, one or more quest management servers may be communicatively coupled to a data integration server and configured to manage each quest. Data identifying activities completed by a user may be processed with configuration rules applied to monitor and determine when a quest is completed. Further, one or more graphical user interfaces may be provided to enable an administrator or operator to define and schedule quests. These and other embodiments, features, and implementations are described herein.

Consistent with the present disclosure, a system of one or more computing apparatuses can be configured to perform particular operations or actions by virtue of having software, firmware, hardware, or a combination of them installed thereon that in operation causes or cause the computing apparatus to perform the operations or actions. One or more computer programs can be configured to perform operations or actions by virtue of including instructions that, when executed by a data processing apparatus (such as one or more processors), cause the apparatus to perform such operations or actions.

One aspect of the present disclosure includes a computer-implemented system for tracking user activity and managing quests. The computer-implemented system may include a website server configured to operate a website that enables a user to activate a quest, the quest comprising one or more activities to be performed at a physical location. In some implementations, a terminal or kiosk at a physical location may be enable a user to activate the quest. The system may also include a data integration server communicatively coupled to the website server and configured to receive, from the website server or other terminal, first identity data representing an identity of the user and data identifying the quest activated by the user, and store the first identity data and the data identifying the quest activated by the user. The data integration server may be implemented, for example, as a cloud-based server or as a server located on the premises of a property or physical location. The system may also include one or more reporting devices communicatively coupled to the data integration server. Each reporting device may be configured to: receive second identity data representing the identity of the user at the physical location; generate activity tracking data in response to the user performing an activity associated with the quest at the physical location; and transmit the second identity data and the activity tracking data to the data integration server. The data integration server may be further configured to store the second identity data and activity tracking data transmitted from each reporting device. The system may also include a quest management server communicatively coupled to the data integration server. The quest management service may be configured to: identify the user and quest activated by the user based on the first identity data and data identifying the quest stored in the data integration server; further identify the user and activity data related to the quest based on the second identity data and activity tracking data stored in the data integration server; monitor a progress of the user to complete the quest based on the activity tracking data stored in the data integration server; determine whether the quest is completed based on the monitored progress of the user to complete the quest; and upon determining that the quest is completed, automatically generate reward data for the user and transmit the reward data to the data integration server.

Implementations may include one or more of the following features. The website server is further configured to enable the user to activate the quest by at least one of applying a payment or using credits obtained by the user playing at least one online game executed through the website. A plurality of reporting devices may be located at the physical location. The plurality of reporting devices may include two or more of an electronic gaming machine, a server, a smartphone, a point-of-sale device, a bar code reader, a magnetic card reader, a contactless chip detector, a biometric reader, a camera, a geo-location detector, and a beacon reader. Each reporting device may be configured to transmit the second identity data and activity tracking data to the data integration server each time the identity of the user is validated and the user completes a particular activity related to the quest. The quest management server may be further configured to aggregate the second identity data and activity tracking data stored in the data integration server, and monitor the progress of the user to complete the quest based on the aggregated second identity data and activity tracking data.

Implementations may also include one or more of the following features. The data integration server is further configured to associate and store the first identity data, the data identifying the quest, the second identity data, and the activity tracking data. Additionally or alternatively, the data integration server is further configured to periodically transmit, to the quest management server, the second identity data and activity tracking data. Each reporting device is further configured to: validate the identity of the user, and transmit the second identity data to the data integration server in response to validating the identity of the user. The quest management server is further configured to transmit a poll request to the data integration server to obtain one or more of the first identity data, the second identity data, and the activity data from the data integration server.

In some implementations, the physical location comprises at least one of a casino, a hotel or other lodging facility, a food or beverage facility, and a retail store. Further, in some implementations, the one or more activities associated with the quest comprise at least one of visiting the physical location, staying at the physical location a predetermined amount of time, playing a game, achieving a designated achievement in the game, conducting a transaction, or interacting with a designated individual. The reward data may identify at least one of a cash reward, a voucher reward, a point reward, or a discount reward. The website server may be further configured to operate the website that enables a plurality of users to play one or more online games and obtain credits to activate one or more quests, each quest being associated with a plurality of activities to be performed at one or more physical locations.

Still further, in some implementations the data identifying the quest includes expiration data representing at least one of a start date or an expiration date for completing the quest. Further, the quest management server may be configured to determine whether the quest is completed on or before the expiration date based on the monitored progress of the user to complete the quest. The quest management server may also be configured to generate data for displaying the monitored progress of the user to complete the quest, and further generate data, upon determining that the quest is completed, for displaying the reward data for the user. Moreover, the quest management server may be configured to provide an interface to receive configuration data for configuring each quest, and transmit the configuration data to the website server.

Another aspect includes a computer-implemented system for tracking user activity and managing quests, each quest being activated online by a user and comprising one or more activities to be performed at a physical location or online. The computer-implemented system may include a first server configured to store first identity data representing an identity of the user and data identifying the quest activated by the user, receive, from at least one reporting device, second identity data representing the identity of the user at the physical location and activity tracking data in response to the user performing an activity associated with the quest at the physical location, and store the second identity data and the activity tracking data to the first server. The system may further include a second server communicatively coupled to the first server and configured to identify the user based on the first identity data or the second identity data in response to receiving the first identity data or the second identity data from the first server, and transmit the second identity data and additional activity tracking data to the first server for storage. Moreover, the system may include a quest management server communicatively coupled to the first server. The quest management server may be configured to identify the user and quest activated by the user based on the first identity data and data identifying the quest stored in the first server, further identify the user and activity data related to the quest based on the second identity data and activity tracking data stored in the first server, and monitor a progress of the user to complete the quest based on the activity tracking data stored in the first server. The quest management server may also be configured to determine whether the quest is completed based on the monitored progress of the user to complete the quest, and upon determining that the quest is completed, automatically generate reward data for the user and transmit the reward data to the first server.

Still another aspect of the present disclosure includes a computer-implemented method for tracking user activity and managing quests. The method may include steps performed by at least one processor. For example, the method includes receiving, from a website server, first identity data representing an identity of a user and data identifying a quest activated by the user, the quest comprising one or more activities to be performed at a physical location, and receiving, from at least one reporting device, second identity data representing the identity of the user at the physical location, and activity tracking data in response to the user performing an activity associated with the quest at the physical location. Further, the computer-implemented method may include identifying the user and the quest activated by the user based on the first identity data and data identifying the quest, further identifying the user and activity data related to the quest based on the second identity data and activity tracking data, monitoring a progress of the user to complete the quest based on the activity tracking data, determining whether the quest is completed based on the monitored progress of the user to complete the quest, and upon determining that the quest is completed, automatically generating reward data for the user and transmitting the reward data to a server for storage.

Implementations may include one or more of the following features. The method performed by the at least one processor further includes enabling the user to activate the quest by at least one of applying a payment or using credits obtained by the user playing at least one online game executed through a website. The at least one reporting device comprises a plurality of reporting devices located at the physical location and wherein the plurality of reporting devices comprise two or more of an electronic gaming machine, a server, a smartphone, a point-of-sale device, a bar code reader, a magnetic card reader, a contactless chip detector, a biometric reader, a video camera, a geo-location detector, and a beacon reader.

Additionally, implementations may include one or more of the following features. The method further includes receiving, from each reporting device, the second identity data and activity tracking data each time the identity of the user is validated and the user completes a particular activity related to the quest. The method may further include aggregating the second identity data and activity tracking data and monitoring the progress of the user to complete the quest based on the aggregated second identity data and activity tracking data. The method may further include associating and storing the first identity data, the data identifying the quest, the second identity data, and the activity tracking data.

Still further, implementations may include one or more of the following features. The physical location comprises at least one of a casino, a hotel or other lodging facility, a food or beverage facility, and a retail store. The one or more activities associated with the quest comprise at least one of visiting the physical location, staying at the physical location a predetermined amount of time, playing a game, achieving a designated achievement in the game, conducting a transaction, or interacting with a designated individual. The reward data identifies at least one of a cash reward, a voucher reward, a point reward, an achievement-type reward, or a discount reward. The data identifying the quest includes expiration data representing at least one of a start date or an expiration date for completing the quest. The method may further include determining whether the quest is completed on or before the expiration date based on the monitored progress of the user of complete the quest. The method may further include generating data for displaying the monitored progress of the user to complete the quest, and further generating data, upon determining that the quest is completed, for displaying the reward data for the user. The method may further include providing an interface to receive configuration data for configuring each quest, and transmitting the configuration data to the website server.

Systems and methods consistent with the present disclosure may be implemented using any suitable combination of software, firmware, and hardware. Implementations of the present disclosure may include programs or instructions that are machine constructed and/or programmed specifically for performing functions associated with the disclosed operations or actions. Still further, non-transitory computer-readable storage media may be used that store program instructions, which are executable by at least one processor to perform the steps and/or methods described herein.

It will be understood that the foregoing description and the following detailed description are exemplary and explanatory only, and are not restrictive of the disclosed embodiments.

BRIEF DESCRIPTION OF DRAWING(S)

Reference will now be made to the accompanying drawings which illustrate exemplary embodiments of the present disclosure and in which:

FIG. 6 illustrates an example graphical user interface for configuring a quest, consistent with embodiments of this disclosure.

FIG. 7 illustrates another example graphical user interface for configuring a quest, consistent with embodiments of this disclosure.

DETAILED DESCRIPTION

Figure 1:
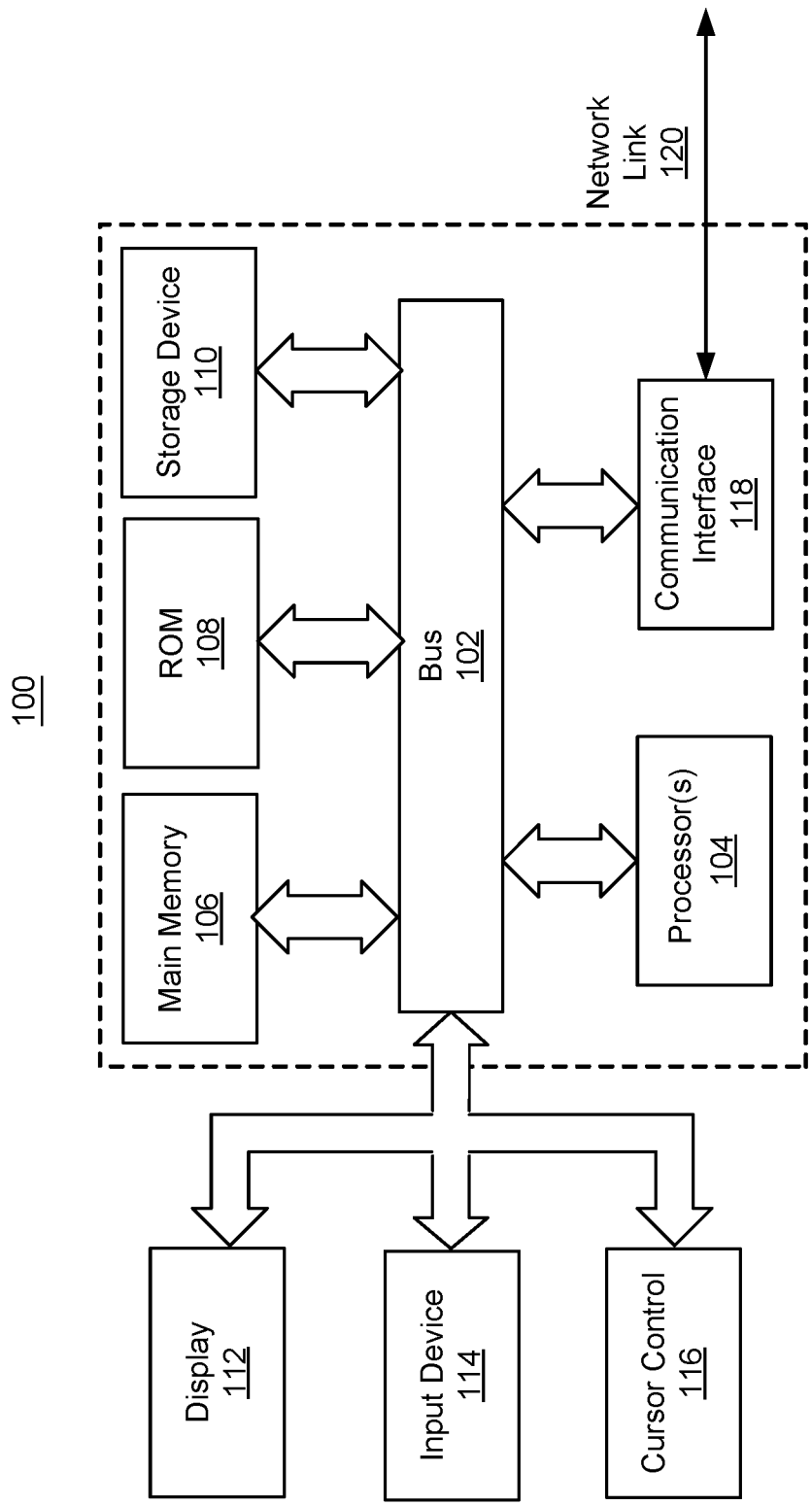
FIG. 1 illustrates an example computing apparatus for implementing systems and methods for tracking user activity and managing quests, consistent with embodiments of this disclosure.

Reference will now be made in detail to exemplary embodiments of the computer-implemented systems and methods of the present disclosure, examples of which are illustrated in the accompanying drawings. Wherever possible, the same reference numbers will be used throughout the drawings to refer to the same or like parts. The terminology used in the description presented herein is not intended to be interpreted in any limited or restrictive manner simply because it is being utilized in conjunction with a detailed description of certain specific embodiments. Furthermore, the described implementations include several novel features, no single one of which is solely responsible for its desirable attributes or which is essential to the systems and methods described herein.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C. The term "and/or" in this disclosure, unless specifically stated otherwise or infeasible, is used interchangeably with and considered equivalent as the term "or."

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its purpose is to present some features of one or more embodiments in a simplified form as a prelude to the more detailed description presented later. For convenience, the term "certain embodiments" or "example embodiment" may be used herein to refer to a single embodiment or multiple embodiments of the disclosure.

Embodiments described herein may refer to a non-transitory computer readable medium containing instructions that when executed by at least one processor, cause the at least one processor to perform a method or set of operations. Non-transitory computer readable mediums may be any medium capable of storing data in any memory in a way that may be read by any computing device with a processor to carry out methods or any other instructions stored in the memory. The non-transitory computer readable medium may be implemented as software, firmware, hardware, or any combination thereof. Software may preferably be implemented as an application program tangibly embodied on a program storage unit or computer readable medium consisting of parts, or of certain devices and/or a combination of devices. The application program may be uploaded to, and executed by, a computing apparatus or machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

Memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. Examples of memory include one or more separate storage devices collocated or disbursed, capable of storing data structures, instructions, or any other data. Memory may further include a memory portion containing instructions for the processor to execute. Memory may also be used as a working memory device for the processors or as a temporary storage.

Some implementations may involve at least one processor. A processor may be any physical device or group of devices having electric circuitry that performs a logic operation on input or inputs. For example, at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some implementations, the at least one processor may include more than one processor. Each processor may have a similar construction, or the processors may be of differing constructions that are electrically connected or disconnected from each other. For example, processors may be separate circuits or integrated in a single circuit. When more than one processor is used, the processors may be configured to operate independently or collaboratively. Processors may be coupled electrically, magnetically, optically, acoustically, mechanically or by other means that permit them to interact.

Consistent with the present disclosure, some implementations may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some implementations, a network may include one or more physical links used to exchange data, such as Ethernet, coaxial cables, twisted pair cables, fiber optics, or any other suitable physical medium for exchanging data. A network may also include a public, wired network and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In some implementations, machine learning algorithms may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyperparameters are set according to the training examples and the validation examples, and the parameters are set according to the training examples and the selected hyper-parameters. The machine learning algorithms may be further retrained based on any output.

Certain embodiments disclosed herein may include computer-implemented systems and methods for performing operations or methods comprising a series of steps. The computer-implemented systems and methods may be implemented by one or more computing devices, which may include one or more processors as described herein. The computing device may be one or more computers or any other devices capable of processing data. Such computing devices may include a display such as an LED display, augmented reality (AR), or virtual reality (VR) display. However, the computing device may also be implemented in a computing system that includes a back end component (e.g., as a data server), or that includes a middleware component (e.g., an application server), or that includes a front end component (e.g., a user device having a graphical user interface or a Web browser through which a user can interact with an implementation of the systems and techniques described here), or any combination of such back end, middleware, or front end components. The components of the system and/or the computing device can be interconnected by any form or medium of digital data communication (e.g., a communication network). Examples of communication networks include a local area network ("LAN"), a wide area network ("WAN"), and the Internet. The computing device can include clients and servers. A client and server can be remote from each other and can interact through a communication network. The relationship of client and server arises by virtue of computer programs running on the respective computers and having a client-server relationship to each other.

Implementations of the present disclosure include systems, methods, and non-transitory computer-readable media for tracking user activity at one or more physical locations. User activity may be collected and reported by one or more different reporting devices. As further disclosed herein, the reporting devices may be interconnected and/or communicatively coupled to a data integration server or a collection of servers. Systems and methods consistent with the present disclosure may be implemented for a wide range of applications, including applications where a quest is obtained online by a user and activities related to the quest are tracked and monitored over time while they are performed by the user at one or more physical locations. Quests may be configured by an administrator and vary over time. In some implementations, one or more quest management servers may be communicatively coupled to a data integration server and implemented to manage each quest. Data identifying activities completed by a user may be processed with rules applied to monitor and determine when a quest is completed. Still further, in some aspects, a graphical user interface may be provided to enable an administrator or operator to define and schedule quests. These and other embodiments, features, and implementations are described herein.

As used herein, a "user" refers to an individual or group of individuals. Individuals may be associated with one another or organized into groups to perform a user activity. A "quest," as used herein, refers to a set of actions or activities to be performed by a user. In some implementations, a quest may include a single action or activity. In other implementations, a quest may include a plurality of actions or activities. The actions or activities for a quest may be related to each other or independent of one another. For example, a collection quest may require a user to collect a specific number of items. A point quest may require a user to reach a specific number of points in a certain amount of time. An action quest may require a user to perform a specific act or set of activities. Still further, according to implementations of this disclosure, a quest may include any combination of activities to be performed online and/or at one or more physical locations. For example, a quest may include only activities to be performed virtually or online (e.g., via a website or a mobile application). A quest may include only activities to be performed at one or more physical locations. A quest may also include an activity to be performed online and an activity to be performed at a physical location. Other implementations and combinations will be apparent from this disclosure.

As noted above, systems and methods consistent with the present disclosure may be implemented for different applications. By way of example, an enterprise or other entity may provide gaming services, entertainment services, lodging services, restaurants, and/or retail shopping. Quests may be defined for users who visit or use any combination of these establishments or services. If a quest is completed by a user, a reward or promotion may be issued to the user. A specific reward may be defined for each quest. Examples of rewards include a cash reward, a voucher reward, a point reward, or a discount reward. With the computerized implementations of the present disclosure, user activity for a quest may be monitored and a specific award may be granted to a user when it is determined that the user has completed all activities defined for the quest.

An "activity," as used herein, refers to a defined user action or behavior. An activity may be performed virtually or online (e.g., via a website or a mobile application). An activity may be performed at one or more physical locations.

A physical location may be defined geographically (e.g., by town, city, state, or country, or a predetermined radius around a location defined by latitude, longitude) or based on a location of an establishment or business (e.g., a casino or other gaming facility, a theatre or other entertainment facility, a hotel or other lodging facility, a food or beverage facility, or a retail store). An activity may be a single action or behavior and/or a set of actions or behaviors. An activity may be performed by a single individual or more than one individual. An activity may be an action performed by an individual or user interacting with an entity. For example, the activity may be making a transaction for goods or services with a particular business or entity. An activity may also be an action performed by a user or a user's device. For example, an activity can be a user or a user's device (e.g., a magnetic card, a contactless chip card, a mobile phone, or a tablet) being present at a physical location. An activity can also be a user interacting with a device at a physical location or completing an activity at a physical location. Other implementations of activities will be apparent from this disclosure.

By way of example, a quest may relate to virtual or online activities. An activity may be performing a specific action via augmented reality and virtual reality (AR/VR) devices. For example, in an electronic or online gaming situation, an activity may include performing a specific movement, pose, and/or any other action with one or more AR/VR devices. In a gaming situation, an activity may be an action or behavior performed by the user's role in the game. For example, a gaming activity may be completing or participating in a specific game. The gaming activity could also be achieving a specific number of wins or points in a game. The gaming activity could also relate to one or more specific achievements in a game, such as collecting certain item(s), discovering or eliminating certain target(s), or performing certain action(s) in the game.

As described above, a quest may include one or more activities to be performed by a user at a physical location. An activity may be appearing at a specific location. For example, a user may be required to appear at a certain restaurant, theatre, store, hotel, and/or in a certain geographic location or area. Also, as an activity, the user may be required to bring a friend to a physical location. As further examples, an activity may require a user to purchase a certain amount, a certain item, and/or by a certain method (e.g., by a membership card, a certain credit card, a barcode, a QR code, a mobile app, and/or any other payment method). An activity may be performed by a device. For example, an activity may be performed on a user's device (e.g., a mobile phone, wearable device, and/or any computing device) or a device at a physical location (e.g., a monitor device, scanner, a Point of sales (POS) system, an electronic gaming machine, and/or any other devices or machines). Other examples of an activity may include unlocking a screen on a mobile phone, activating a link, launching a mobile application, and scanning an identification related to the user (e.g., user's biometrics information, government ID, and/or any other user identification).

"Points," as used herein, refer to a quantity or level of achievement, loyalty or other value associated with a user in a system or across multiple systems. Points may be earned or achieved through activities of a user (e.g., playing an online game, staying at a hotel, purchasing food or beverages, purchasing goods or services, etc.). Points may be redeemed or exchanged for discounts, rewards, coupons, gift cards, or other items. In some implementations, points of a user may be redeemed or applied to activate a quest, as further disclosed herein. Points may also be earned by successfully completing a quest. Point information associated with a user (e.g., the total number of current points of a user and their point history, including exchanges or redemptions) may be recorded in a database or other memory in a system. In some implementations, point information of a user may be associated with their profile or user account. Further, in some aspects, point information may be accessed when a user is identified via a mobile phone application, a website login, and/or any other process through which their identity is validated. Additionally or alternatively, point information from memory may be accessed when activity of that user is confirmed or reported in the system.

Implementations of the present disclosure are described herein with reference to a gaming situation (e.g., an environment including online games and/or games played in-person at a casino or other gaming facility). It will be appreciated that the systems and methods of this disclosure may be implemented for other applications and activities, including those related to hotels, theatres, and other entertainment facilities, restaurants, and retail stores. Therefore, the examples herein are not limiting to the full scope and applications applicable to the systems and methods of this disclosure.

In a gaming situation, an online game may comprise any video game that is accessible partially or primarily via a network such as the Internet. An online game may be played by a single user and/or multiple users. An online game may be accessed via user's device (e.g., a mobile phone, tablet, wearable device, and/or any other computing device). An online game may also be a game conducted at a physical location with an online component. Games at a physical location such as a casino may also include physical games (like card games or roulette) as well as electronic games that require the physical presence of the user to play the game. Electronic games may be implemented with electronic gaming machines and require a wager or other form of payment to play the game. As used herein, the term "game" refers to all forms of games, including online games, physical games, and electronic games.

At one or more physical locations, an entity may provide gaming services and/or other services, such as entertainment services, lodging services, food and beverage services, and/or retail shopping. The entity may desire to offer quests to users to offer or promote one or more products or services. Quests may also offer a way for users to redeem points and obtain any of a number of rewards for completing activated quests. Examples of rewards include in-game currency or other items, access to new levels or areas, increased character experience, enhanced play skills or abilities, future game enrollment, or any combination of the above. Rewards may also include, for example, cash, gift cards, credit card points, discounts, vouchers, coupons, physical gifts, consumer goods or services, food, drinks, and so on.

There are technical challenges with collecting and tracking user activity across multiple platforms and/or locations. Often, relevant data is not shared and/or reporting devices are localized, and relevant data is not communicated for processing. Sharing data across multiple devices or platforms is also challenging due to disparate data formats or protocols and/or the lack of programming interfaces (such as APIs). Different sales, inventory, and/or customer resource management systems can also complicate the matter.

Implementations of the present disclosure provide technical solutions for addressing the above challenges and enabling the efficient tracking of user activity and management of quests. In some implementations, a computer-implemented system is provided for tracking user activity and managing quests. The system includes a website server, a data integration server, at least one reporting device, and a quest management server. The data integration server may process and store data collected from a website server and reporting devices. The quest management server may analyze the data in the data integration server to monitor and track the progress of user activities across multiple devices and/or platforms and determine the completion of quests. Implementations of the present disclosure also include computer-implemented methods and computer readable media for performing the operations and steps related to the herein-disclosed systems.

FIG. 1 illustrates an example computing apparatus 100 for implementing systems and methods for tracking user activity and managing quests, consistent with embodiments of the present disclosure. The tracking and managing quests may include any procedure or analysis in which one or more user activities and quests are involved. Such a procedure or analysis may also involve, for example, the detection of starting or activating a quest by an individual user or multiple users. Tracking and managing quests may also involve, for example, the detection of the completion of activities and determination of the progress of an individual user or multiple individual users toward completing all activities related to a quest. It may also include the generation and assignment of reward data when the quest is completed.

As illustrated in FIG. 1, apparatus 100 includes a bus 102 and/or other communication components for communicating information and one or more hardware processor(s) 104 communicatively coupled with bus 102 for receiving and transmitting information. Processor(s) 104 can include, for example, a general-purpose microprocessor or central processing unit. Apparatus 100 also includes a main memory 106, such as a random access memory (RAM) or other dynamic storage devices, coupled to bus 102 for storing information and instructions to be executed by processor 104. Main memory 106 also can be used for storing temporary variables or other intermediate information during the execution of instructions to be executed by processor 104. Such instructions, when stored in non-transitory storage media accessible to processor 104, render computing apparatus 100 into a special-purpose machine that is customized to perform the operations specified in the instructions. computing apparatus 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

In some embodiments, computing apparatus 100 can be coupled via bus 102 to a display device 112, such as a cathode ray tube (CRT), liquid crystal display, or touch screen, for displaying information to a computer user. An input device 114, including alphanumeric and other keys, may also be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device can have two degrees of freedom in two axes, a first axis (for example, x) and a second axis (for example, y), that allows the device to specify positions in a plane.

Computing apparatus 100 can implement disclosed embodiments using customized hard-wired logic, one or more ASICs or FPGAs, firmware, software and/or program logic, which in combination causes or programs computing apparatus 100 to be a special-purpose machine. According to some embodiments, the operations, functionalities, and techniques disclosed herein are performed by computing apparatus 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform process steps consistent with disclosed embodiments. In some embodiments, hard-wired circuitry of firmware can be used in place of or in combination with software instructions.

The term "storage media" can refer, but is not limited to, to any non-transitory media that stores data and/or instructions that cause a machine to operate in a specific fashion. Such storage media can comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio-wave and infrared data communications.

Various forms of media can be involved in carrying one or more sequences of one or more instructions to processor(s) 104 for execution. For example, the instructions can initially be carried on a magnetic disk or solid state drive of a remote computer. The remote computer can load the instructions into its dynamic memory and send the instructions over a network line communication line using a modem, for example. A modem local to computing apparatus 100 can receive the data from the network communication line and can place the data on bus 102. Bus 102 carries the data to main memory 106, from which processor 104 retrieves and executes the instructions. The instructions received by main memory 106 can optionally be stored on storage device 110 either before or after execution by processor(s) 104.

Computing apparatus 100 also includes a communication interface 118 coupled to bus 102. Communication interface 118 provides a two-way data communication coupling to a network link 120 that is connected to a network, such as a local network or public network. For example, communication interface 118 can be an integrated services digital network (ISDN) card, cable modem, satellite modem, or a modem to provide a data communication connection to a corresponding type of telephone line or data network. As another example, communication interface 118 can be a local area network (LAN) card to provide a data communication connection to a compatible LAN. Communication interface 118 can also use wireless links (e.g., WiFi) and communicate to public networks such as the Internet. Communication interface 118 may send and receive electrical, electromagnetic, and/or optical signals that carry digital data streams representing various types of information.

Network link 120 may provide data communication through one or more networks. For example, network link 120 can provide a connection through a local network to other computing devices connected to the local network or to an external or public network, such as the Internet or other Wide Area Network. These networks use electrical, electromagnetic, and/or optical signals that carry digital data streams. The signals through the various networks and the signals on network link 120 and through communication interface 118, which carry the digital data to and from computing apparatus 100, are examples of forms of transmission media. Computing apparatus 100 can send messages and receive data, including program code, through the network(s), network link 120 and communication interface 118. In the Internet example, a server (not shown) can transmit requested code for an application program through the Internet (or Wide Area Network), the local network, and communication interface 118. The received code can be executed by processor 104 as it is received and/or stored in storage device 110 or other non-volatile storage for later execution.

Figure 2:
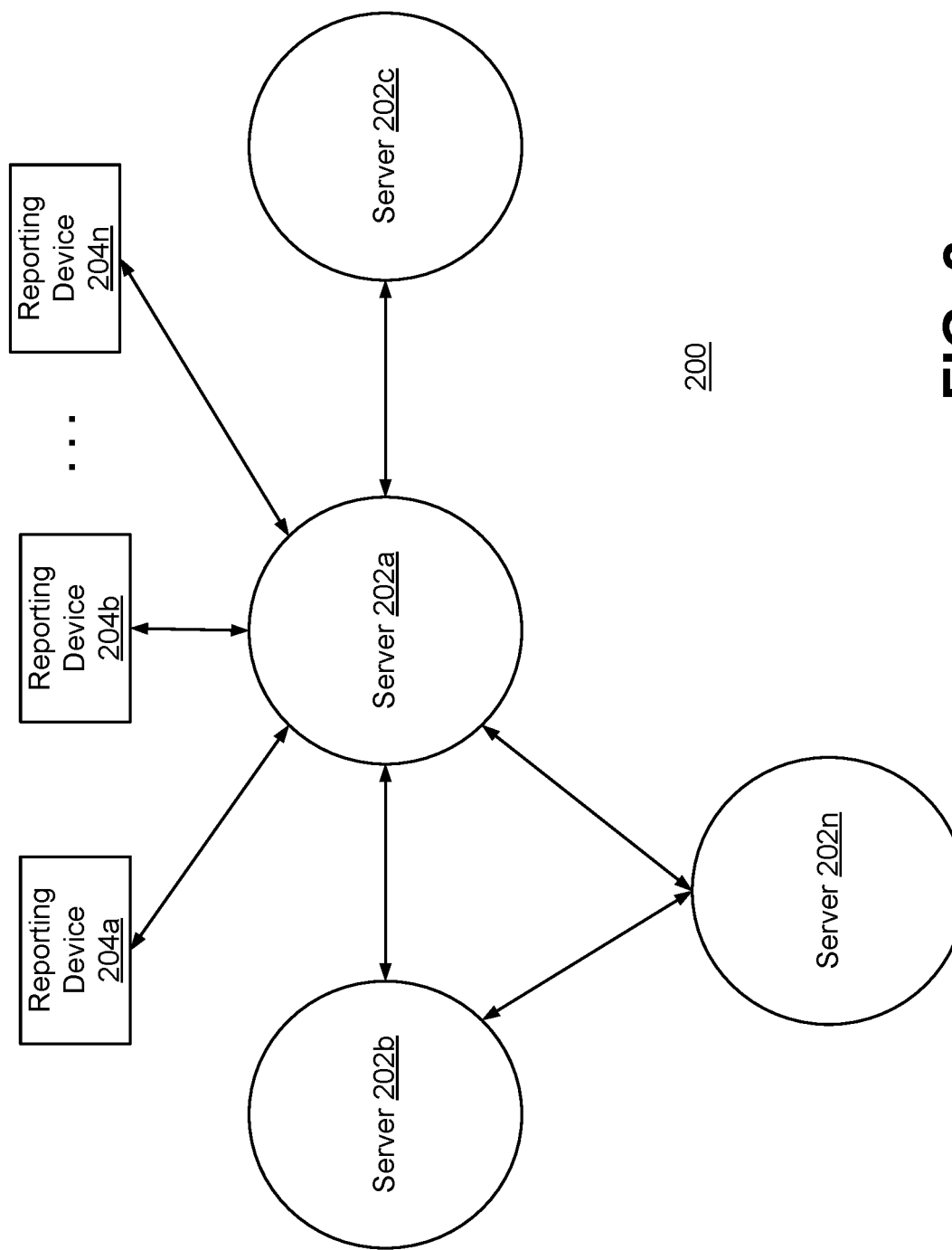
FIG. 2 illustrates an example arrangement of servers and reporting devices for implementing systems and methods for tracking user activity and managing quests, consistent with embodiments of this disclosure.

FIG. 2 illustrates an example system 200 for implementing systems and methods for tracking user activity and managing quests, consistent with embodiments of the present disclosure. As shown in FIG. 2, system 200 may include one or more servers and one or more reporting devices. Each server can be implemented with a computing apparatus, such as apparatus 100 of FIG. 1. As an example, system 200 includes data integration server 202a, website server 202b, and quest management server 202c. System 200 may further include other servers 202n. The servers may be communicatively coupled to one another and to the one or more reporting device 204a-204n using, for example, a communication network (such as a local network or the Internet) or direct communication links (wired or wireless links). For example, data integration server 202a may be communicatively coupled to website server 202b and quest management server 202c. The number and arrangement of components in FIG. 2 are exemplary and can be modified. Thus, other arrangements are possible, consistent with the present disclosure.

By way of example, data integration server 202a may be configured to receive first identity data that represents an identity of a user from website server 202b. Data integration server 202a may also be configured to receive data identifying the quest activated by the user from website server 202b. Upon receiving the data, data integration server 202a may be configured to store the user identity data and the data identifying the quest activated by the user.

Website server 202b may be communicatively coupled to data integration server 202a. Website server 202b may be configured to operate a website that enables a user to activate a quest with credits, points, or a payment. Website server 202b may be configured to transmit the first identity data that represents an identity of a user and data identifying the quest activated by the user to the data integration server 202b.

Quest management server 202c may be communicatively coupled to data integration server 202a. Quest management server 202c may be configured to identify the user and quest activated by the user, based on the first identity data and data identifying the quest stored in the data integration server 202a. Further, quest management server 202c may be configured to identify the user and activity data related to the quest, based on second identity data and activity tracking data stored in the data integration server 202a. Also, quest management server 202c may be configured to monitor a progress of the user to complete the quest, based on the activity tracking data stored in the data integration server 202a. Quest management server 202c may be configured to determine whether the quest is completed, based on the monitored progress of the user to complete the quest. Upon determining that the quest is completed, quest management server 202c may be configured to automatically generate reward data for the user and transmit the reward data to the data integration server 202a.

Server 202n may comprise one or more additional or supporting servers. For example, server 202n may comprise additional data integration servers, website servers, and quest management servers, or one or more supporting servers that facilitate the operations of data integration server 202a, website server 202b, and quest management server 202c.

As further shown in FIG. 2, system 200 may include one or more reporting devices 204a . . . 204n. The reporting devices 204a . . . 204n are communicatively coupled to at least data integration server 202a. Each reporting device, for example, reporting device 204a, is configured to receive second identity data representing the identity of the user at a physical location. A reporting device may be configured to generate activity tracking data in response to the user performing an activity associated with the quest at the physical location. A reporting device may then transmit the second identity data and the activity tracking data to the data integration server 202a.

Website server 202b may include hardware (e.g., one or more computers) and/or software (e.g., one or more applications) that deliver web content that may be accessed by, for example, a user device (e.g., mobile device, laptop, computer) through a network, such as the internet. Each website server may host and operate a website. In some implementations, website servers may deliver web pages relating to, for example, gaming applications and the like, to users. A website server may use, for example, a hypertext transfer protocol (HTTP/HTTPS or sHTTP) to communicate with a user device. The web pages delivered to a user device may include, for example, HTML documents, which may include images, style sheets, and scripts in addition to text content.

A user may operate, for example, a web browser, web crawler, or native mobile application, or other application and initiate communication by making a request for a specific resource using HTTP/HTTPS, and a website server may respond with the content of that resource or an error message if unable to do so. The resource may be, for example, a file stored on the backend of the website server. A website server also may enable or facilitate receiving content from a user device so a mobile device may be able to, for example, submit web forms, including uploading of files.

Each website server may enable or facilitate executing a game from a user device. The game may be executed on an application and/or a website accessing from a user device. In one embodiment, for example, a website server may use any technology for presenting multimedia dynamic content, such as Hyper Text Markup Language 5 (HTML5), Adobe-Flash™, and any other software languages. In some embodiments, the game may be executed on multiple user devices. This can be achieved by executing applications on the user devices and/or through websites.

Website server 202*b* may enable or facilitate receiving a user's request so a user device may be able to, for example, submit purchase requests, including quest purchase requests. The quest purchase requests may contain information such as user identity data, data identifying a quest, purchase price, credit card information, and/or other information to facilitate the transactions. Users may also use virtual items (e.g., in-game currency, points, and the like) to purchase or activate quests.

Website server 202*b* may enable a user to activate a quest. For example, based on configuration data related to a quest, a website server may enable the activation of the quest for a user. The configuration data may include, for example, a type of quest, a target amount, a type of game, a type of activity, location information, date and timing information (e.g., at least one of a start date and time, or an expiration date and time for a quest), and/or any other variables. In one embodiment, a website server may enable multiple users to activate one or more quests. For example, the users may be activating the same quest at once or the users may each activate a different quest. In some embodiments, a user may activate the quest on a website. In some other embodiments, a user may activate the quest on a user device connecting to a website server.

In some implementations, configuration data for a quest may include expiration data. The expiration data may be used to represent at least one of a start date or an expiration date and time for completing a quest. For example, Quest A may have an expiration date of Jul. 1, 2021 at 12 noon. A user activating Quest A would have from the time of activating the quest to the expiration date and time (i.e., Jul. 1, 2021 at 12 noon) to complete the quest. In some embodiments, the expiration date and time may be different for different quests or users. The amount of time to complete a quest can be set as a design parameter and used to identify which users complete the quest within the allotted time.

A website server also may support server-side scripting using, for example, Active Server Pages (ASP), PIP, or other scripting languages. Accordingly, the behavior of the website server may be scripted in separate files while the actual server software remains unchanged.

Data integration server 202*a* may perform various operations such as receiving and storing user information from a variety of sources. For example, data may be collected from brick-and-mortar institutions (legacy systems), websites, mobile applications, and social networking platforms (online platforms). This data may be provided to the data integration server over a network from each source. As previously noted, data integration server 202*a* may be communicatively coupled to one or more website servers and reporting devices. Each website server and reporting device may send data directly to the data integration server. This may allow the data integration server to receive the data in real time proximate to when it is created or available (e.g., when a user activity is performed or completed). In some implementations, it may be preferable to provide data to the data integration server through indirect communication. For example, one or more intermediate engines (not shown) may be provided to compile data from a plurality of reporting devices at one or more physical locations and then send the data in batches periodically (e.g., hourly, daily, etc.) over a network to the data integration server. Such intermediate engine(s) may perform data translation and/or aggregation before the data is sent to the data integration server. This can elevate differences in data formats or protocols as well as make the ingestion of the data at the data integration server more efficient.

Data integration server 202*a* may process and compile data for storage and subsequent retrieval. The data may be stored according to various structures, files, and formats. In some implementations, the data related to a user may be stored into user account records. Data integration server 202*a* may use the data in user account records for various applications, including to track user activity and to manage quests. Each user account record can also be used to reward data issued to a user for completing a quest. As will be appreciated, user account records may also be used for other applications like sales promotion, marketing, and loyalty programs.

In some implementations, a user account record contains a collection of data related to a user. For example, when the user identity data from a website server is received, data integration server 202*a* may verify the identity of the user. Based on the identified user, data integration server 202*a* may locate the user's account record and store data in that record, such as the quest the user activated. For example, when user A starts Quest Alpha, the data integration server may associate user A with Quest Alpha and store that information in user A's account record. Further, the data integration server may also associate the user identity data with the user activity tracking data. For example, upon receiving the user identity data from a reporting device, the data integration server may verify the identity of the user based on the user identity data and associate the user activity tracking data with the user identity data, and store that data in the user's account record. For example, user B plays three games in a quest, the data integration server will associate user B with the three games and store that data in user B's account record. All data may be stored in a database associated with data integration server 202*a*.

A user's activity tracking data may be monitored or calculated in a number of ways. The user's activity tracking data may include the quests the user has started, the activities the user has completed (e.g., the games the user has played), the time when each activity was performed, the time when a quest was completed, the number of quests started or completed, and/or any other data related to a user's online or onsite behavior. This data may be monitored in real time or on a periodic basis. The user's activity tracking data may be analyzed to develop trends associated with the user account records.

A user's gaming history may be monitored or calculated in a number of different ways. For example, the gaming history may include the frequency at which the user plays or the amount of money the user spends on average. This data may be monitored on a daily, quarterly, and/or annual basis. Optionally, the user's gaming history may be more complex. This may include the user's preferences for certain games or certain types of games and win-loss information that may factor into a user's decision to continue playing that game, move to a different game, or stop playing altogether. The user's gaming history may be analyzed to develop trends associated with the user account records.

Similarly, a user's purchasing history may be monitored or calculated in a number of different ways. The purchasing history may include a record of all transactions with the user. It may also include the frequency at which the user conducts transactions and/or the amount of money the user spends over a certain period of time, on average, such as an average amount spent seasonally or annually, or an average transaction value. The purchasing history may also include a record of all transactions the user made virtually or online. For example, it may include the quests the user activated, the amount of money the user spends for points or a quest, the virtual items the user purchased, and/or the amount the user bet in a wagering game. It may also include the frequency at which the user conducts transactions online and/or the amount the user spends over a certain period of time, on average, such as an average amount spent seasonally or annually, or an average transaction value.

In addition to user's behavior onsite, the data underlying the user account records may include a user's online behavior. This may include information and activity related to a social networking platform, including the connections the user has and the user's identified interests, activities, and interactions with other users. Further, this data may include a user's actions on a website. For example, for a shopping institution, this may include the user's online purchase history. For services-related industries, such as the travel industry, it may include data related to the user's preference for booking travel plans through a website as opposed to other methods. It may also include the frequency at which the user visits the website and engages in a certain activity. For example, data related to an online gaming website may include the user's purchase history, quest purchase history, gaming history, win rates, and preferences for playing certain types of games or at certain time periods. Similarly, the data may include a user's use of a mobile application.

In some embodiments, the data integration server may transmit data to a quest management server. Optionally, the data may include data in a user's account record, including a user's identity data and/or a user's activity tracking data. The data may be transmitted periodically, every second, every millisecond, on a daily, weekly, quarterly, and/or annual basis. Additionally and alternatively, the data may be transmitted when triggered by an event. For example, when the user activates or starts a quest, when the user starts an activity, when a user reaches a certain level in an activity, and/or when other predetermined events happen, a data integration server may transmit the data to a quest management server.

Consistent with the disclosed embodiments, a system may involve one or more reporting devices. Each reporting device may collect identity data, for example, a user identifier and user device information (e.g., IP address, type and make information, etc.). The identity data may involve, for example, machine readable data (e.g., QR code, bar code, and/or any visual representation), biometric identification data (e.g., facial recognition identification, iris scan, fingerprint identification, etc.), location tracking data, indoor navigation data, and/or any other information to recognize the user. Each reporting device may include, for example, a monitor, a detector, a reader, a scanner, a sensor, a GPS chip, an indoor navigation device, a Bluetooth beacon, a server, a point of sales (POS) terminal, a device working with key fobs, a bar code reader, a magnetic card reader, a contactless chip detector, a biometric reader, a camera, a geo-location detector, and/or a beacon reader. Further examples of reporting devices include smartphones, laptops, wearable devices, tablets, and/or any personal electronic device. Users may be recognized by browser cookies, opening a mobile application, logging in to their accounts, inputting account numbers and passwords, and/or entering verification numbers.

Based on the identity data, at least one reporting device may identify and validate the user. In some embodiments, identifying and validating the user may involve comparing the identity data to prestored user identity data. When a match is recognized, the reporting device or other device may identify and validate the user. In some embodiments, at least one reporting device may access a user account records stored in a data integration server for the prestored user identity data. Once the user is identified and validated, at least one reporting device may transmit the identity data to a data integration server.

In some embodiments, a plurality of reporting devices may be located at one or more physical locations. By way of example, in a casino or group of related casinos, a plurality of reporting devices may be implemented. For example, a membership card reader may be used in a lobby or certain gaming machine areas. Facial recognition devices may be implemented in kiosks or other parts of a building. If a casino provides food and beverage services and/or lodge services, POS terminals and/or magnetic card readers may be implemented where those services are rendered. In some embodiments, the plurality of reporting devices may include two or more of an electronic gaming machine, a point of sale device, a bar code reader, a magnetic card reader, a contactless chip detector, a biometric reader, a network video camera, a geo-location detector, and a beacon reader.

The reporting devices may also collect activity tracking data associated with a user. The data may be monitored and communicated directly or indirectly to a data integration server in real-time or on a periodic basis. As discussed above, the data may include the user's progress of completing a quest and/or the time when a user started/completed a quest (or an activity in a quest). For example, reporting devices may access or generate this data through the application where the game is executed, game data reported from an EGM or gaming device, the website where the game is accessed, and/or program(s) running in the background when the device is on. The data may also be entered manually. Upon completion of certain activity or quest, the users may enter information indicating that the activity or quest is completed, or someone at the onsite businesses may enter such information. For example, after completing a quest, the users may access a code, and they may upload the code via the reporting devices.

Consistent with disclosed embodiments, a quest management server may be provided for tracking user activity and managing quests. A quest management server may collect and review user identity data and activity tracking data via a data integration server. Based on a user's progress in completing a quest, the quest management server may determine a percentage for the completion of the quest. When the quest is complete, the quest management server may automatically issue reward data and update the user account record in the data integration server.

In some implementations, the quest management server may determine the user who purchased a quest by reviewing user identity data and comparing such data with the user account records. The user account records may include prestored user identification data. Additionally or alternatively, the quest management server may receive the user information identified by the reporting devices or the data integration server.

The quest management server may determine whether a quest is completed based on activity tracking data or information from the reporting devices or data integration server indicating the quest complete. As discussed above, the data may be monitored and communicated directly or indirectly to a data integration server in real-time or a periodic basis. The data may indicate what activities have been performed and the user's progress toward of completing a quest.

Once a quest is determined to be completed, the quest management server may calculate the number of rewards or points that a user has accrued or earned from playing the quest. For example, the configuration data stored for the quest may be used to calculate the reward data. The points or other reward may be redeemable for free play, restaurant discounts, tickets, lodging, and the like. Additionally, or alternatively, the quest management server may calculate the number of points a user has accrued or earned from online play. These points may be treated differently or the same as points earned at the onsite businesses.

In some implementations, the quest management server may calculate the reward amount or points that a user has accrued from its transactions with the onsite businesses. For example, points may be awarded based on the number of transactions or value of the transactions between the user and the businesses. These points may expire after a certain time. The quest management server may monitor the points value for a certain user and send this information to the data integration server, which may incorporate this information into a user's account record. These points may be exchanged for a quest or other items by the user.

Optionally, by analyzing the collected data, the quest management server may determine user's preferences. This may then be used to determine the type of promotion or type of quest that may be desirable to the user. For example, for a user that regularly completes quests for a food or beverages when visiting the casino, it may be advantageous to offer that user similar promotions. As a further example, if a user completed a certain type of quests in a row, it may be advantageous to offer similar quests to that user. Additionally and alternatively, the quest management server may determine may identify a trend based on the collected user data. This determined information may also be used for identifying quests or promotions to offer the user.

In some implementations, a quest management server may determine the popularity of a quest. For example, to analyze how many users activated a quest, a quest management server may transmit a poll request to a data integration server. Upon receiving the request, the data integration server may transmit data related to activated quests, including how many users activated each quest. Based on the reported data, the quest management server may generate reports about quests, including which quests were most popular and how many users activated each quest. For example, the quest management may calculate how many users started the quest, how many activities were successfully completed, reward issuance and usage, the percentage of quests that were not completed, and/or other insights about quests.

In some implementations, a quest management server includes a user interface (e.g., a monitor, a speaker, a keyboard, a pointing device (e.g., a mouse, a touchpad, a light pen), a tablet, a touch screen, a reader, and/or any input/output devices). A quest management server may generate data for displaying the monitored progress of a user to complete a quest. In some implementations, a graphical user interface displays the progress visually and/or audially to a user. A quest management server may also generate reward data and display reward information to the user when a quest is successfully completed. A graphical user interface may display the reward information visually and/or audially to a user.

In some implementations, a quest management server provides one or more graphical user interfaces to receive configuration data for implementing quests. With configuration data, an administrator may define and schedule a quest. For example, configuration data may include a name of a quest, a description of a quest, an icon of a quest, a type of quest, a target amount, a reward of a quest, a type of game, a type of activity, location information, date and timing information, and/or any other configuration parameters for designing a quest. With the configuration data, the quest management server may schedule and manage quests. The quest management server may also transmit data related to a quest to website server(s). Based on the data, the website server(s) may enable a user to start or activate the quest.

Figure 3:
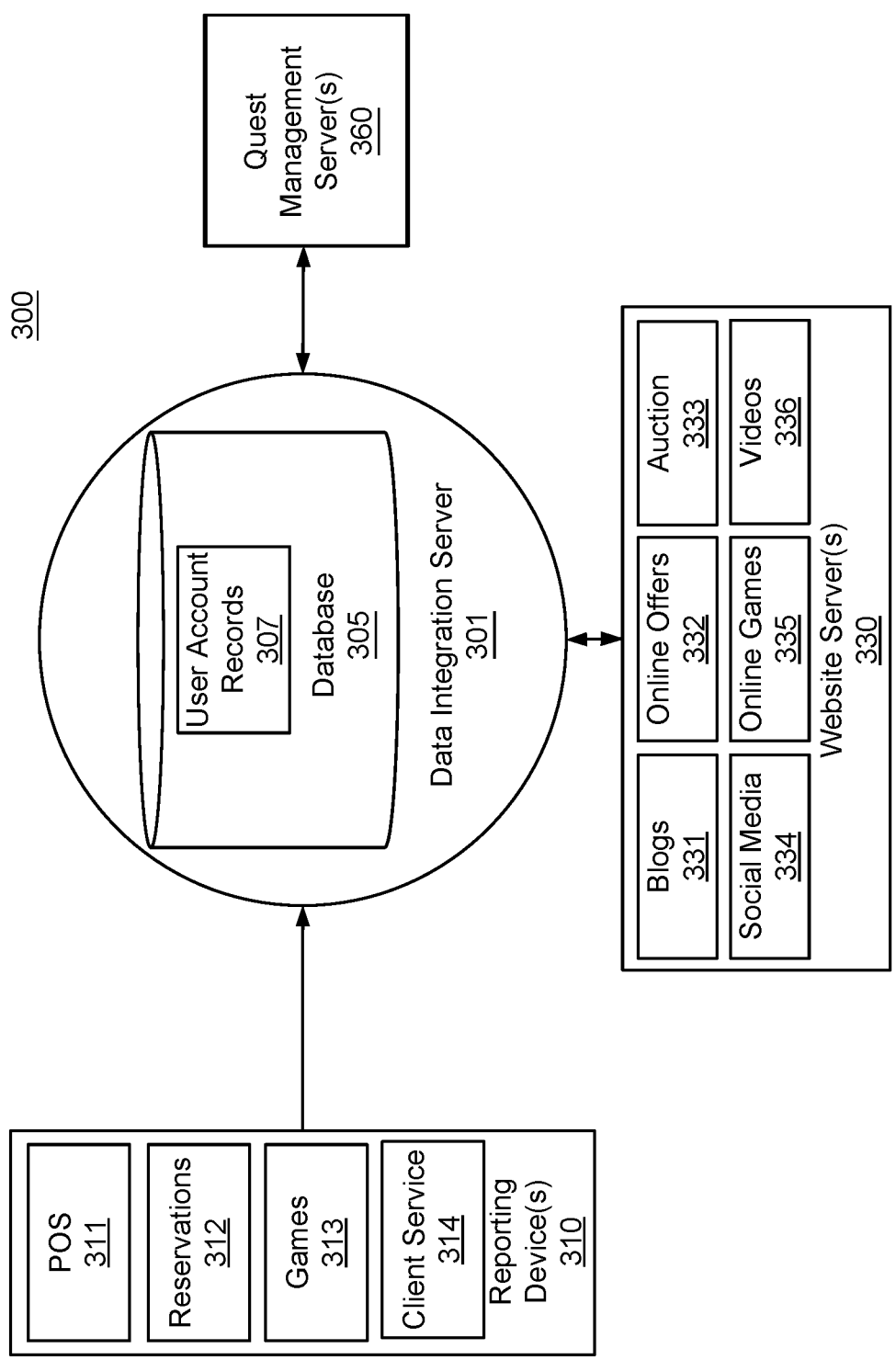
FIG. 3 illustrates an example distributed computing system for tracking user activity and managing quests, consistent with embodiments of this disclosure.

FIG. 3 illustrates an example distributed computing system 300 for tracking user activity and managing quests, consistent with embodiments of the present disclosure. As shown in FIG. 3, data integration server 301 communicates with one or more reporting device(s) 310, one or more website server(s) 330, and at least one quest management server 360. In some embodiments, one or more local and/or wide area networks and/or one or more packet-based and/or public networks, such as the Internet, support the communication between the servers and components shown in FIG. 3. Further, conventional networking protocols and techniques may be used to support the communications between the components and servers of system 300.

According to some implementations, data integration server 301 includes one or more database(s) 305. Database(s) 305 may be implemented as an efficient data store for data that has been transmitted and received from the various components and servers of FIG. 3, such as reporting device(s) 310 and website server(s) 303, as well as quest management server(s) 360. Further, data integration server 300 and database 305 may be implemented to respond to queries from quest management server(s) 360 and provide requested data, including stored data related to users or quests. In some implementations, database 305 is configured to store data related to user account records 307.

User account records 307, as described above, may include data related to users. The data in a user's account record may include identity data and activity data. The data may also include data identifying each quest activated by a user as well as reward data for successfully completed quests. Other data that may be stored in a user's account record include, for example, purchasing history, gaming history, points balance, and demographic and/or geographic attributes. The user account records 307 may also include information related to online activity of users, such as online gaming and account history.

Data integration server 301 processes and integrates data from multiple data sources, such as reporting device(s) 310, website server(s) 330, and quest management server(s) 360. In some embodiments, the data from these sources may require translation or configuration before being stored in database 305. To accomplish this, data integration server 301 can include or utilize one or more data collection engines (not shown). Data collection engines can be communicatively coupled either internal or external to data integration server 301. Data collection engines, according to some implementations, perform functions to translate data from original form into a common or destination form that can be imported into database 305. For example, each data collection engine can include one or more scripts that parse incoming data, extract data from it, and generate an insert statement for adding data to database 305. In addition, each data collection engine may collect data in real time from reporting device(s) 310 and translate the data before providing it to data integration server 301. In some embodiments, the data collection engines can be configured to operate under an ETL (extract transform load) paradigm or another common data extraction and transformation regime.

Reporting device(s) 310 may include, for example, computing devices related to various products and services, such as those related to the hospitality, retail, and gaming industries. The data collected and generated by reporting device(s) 310 can be transmitted and stored in data integration server 300. By way of example, reporting device(s) 310 may include one or more point of sale (POS) terminals 311, one or more reservation systems 312, one or more gaming systems 313 (such as EGMs), and one or more client service systems 314. As will be appreciated from this disclosure, other types of reporting device(s) may be included in system 300.

Website server(s) 330 may execute and support, for example, websites and corresponding webpages for various products and services, such as online gaming sites, reservation systems, e-commerce businesses, and loyalty programs. Data collected by website server(s) 330 may be transmitted and stored in data integration server 301. To further illustrate, in the example of FIG. 3 website server(s) 330 include one or more blogs 331, online offers 332, auctions 333, social media 334, online games 335, and videos 336. The data associated with each of these components can be transmitted and stored in data integration server 301 (e.g., as part of user account records 307).

While FIG. 3 depicts one or more components as external to data integration server 301, in some embodiments, such components can be included as part of data integration server 301. That is, implementations of data integration server 301 are not limited to the components and configuration disclosed in FIG. 3. For example, in some embodiments, data reporting device 310 may be part of data integration server 301 or data integration server 301 and quest management server 360 may be combined in whole or part. The network architecture of system 300 of FIG. 3 is shown as just one example and does not limit the scope of the claims.

Figure 4:
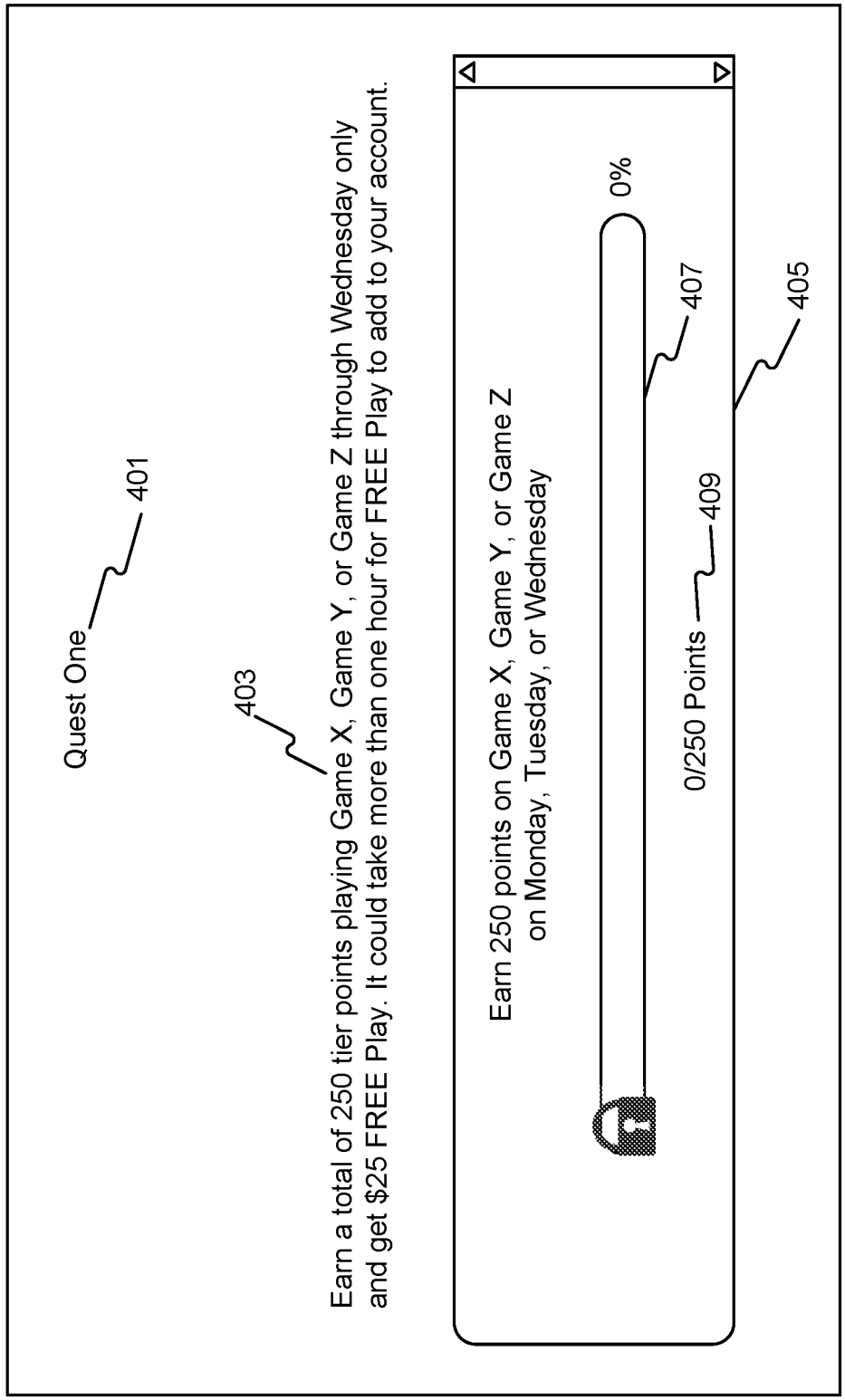
FIG. 4 illustrates an example graphical user interface for displaying information to a user related to a quest that includes at least one activity, consistent with embodiments of this disclosure.

FIG. 4 illustrates an example graphical user interface 400 for displaying information to a user related to a quest, consistent with embodiments of this disclosure. Graphical user interface 400 may be enabled by a quest management server or supporting server, and accessible to a user by using a computing apparatus with a browser or other application connected for communications through a network.

Graphical user interface 400 includes a title of the quest 401 (e.g., "Quest One") and a description of the quest 403 that provides information about the quest. In the example of FIG. 4, the description of the quest 403 includes information about the activity (e.g., earn 250 points by playing Games X, Y, or Z through Wednesday only) and reward (e.g., $25 FREE play) for successfully completing the quest. The description 403 may also include other details related to the quest, such as the estimated time for the reward to show up in a user's account (e.g., more than one hour).

As noted above, a user may activate a quest in a number of ways. For example, in some implementations, points of a user may be redeemed or applied to activate a quest. The activation process may be initiated by clicking on an unlock icon in graphical user interface 400 (see example icon in FIG. 4) and/or confirming the application of points to activate the quest through a separate window or graphical user interface (not shown). Once unlocked, tracking window 405 may provide information on the user's progress toward completing the quest. In the example of FIG. 4, tracking window 405 includes a bar 407 which may be colored or filled to display the percentage of the progress of the quest (e.g., between 0% to 100%). In some implementations, point information 409 may also be provided to display how many points have been earned by the user toward completing the activity. With a quest management server, bar 407 and point information 409 may be updated in real time as the user completes the required activity.

Figure 5:
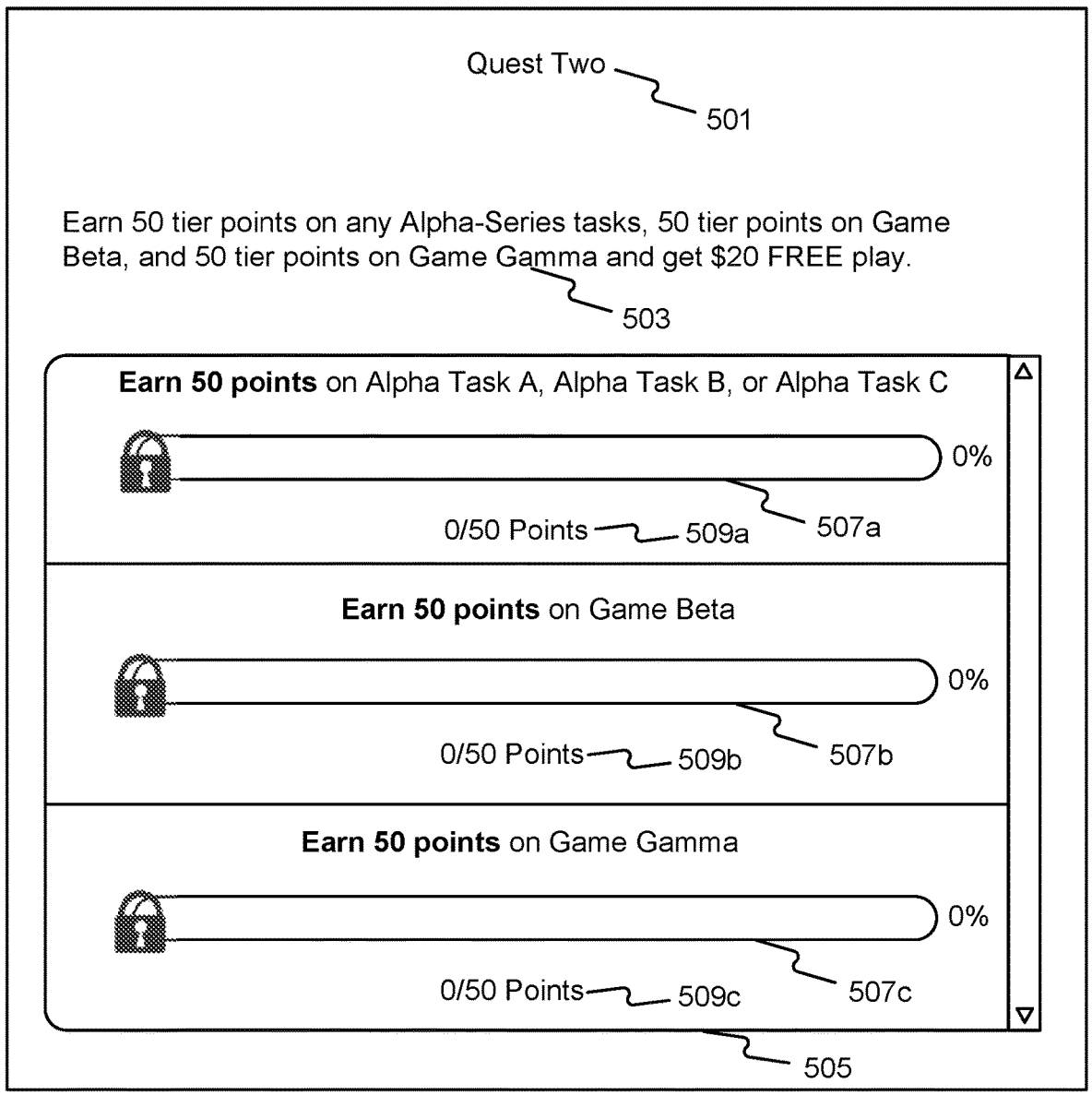
FIG. 5 illustrates another example graphical user interface for displaying information to a user related to a quest that includes a plurality of activities, consistent with embodiments of this disclosure.

FIG. 5 illustrates another example graphic user interface 500 for displaying information to a user related to a quest, consistent with embodiments of this disclosure. In the example of FIG. 5, the quest includes multiple activities. Similar to graphical user interface 400, graphical user interface 500 may be enabled by a quest management server or supporting server and accessible to a user by using a computing apparatus with a browser or other application connected for communications through a network.

Graphic user interface 500 includes a title of the quest 501 (e.g., "Quest Two"), a description of the quest 503 that provides information about the quest. In the example of FIG. 5, the description of the quest 503 includes information about each of the activities (e.g., earning 50 points on Alpha-Series tasks, 50 points on Game Beta, and 50 points on Game Gamma) and reward (e.g., $20 FREE play) for successfully completing the quest. The description 503 may also include other details related to the quest, such as location and time requirements and maximum reward limits.

As previously described, a user may activate a quest by, for example, redeeming or applying points. The activation process may be initiated by clicking on an unlock icon in graphical user interface 500 (see example icons in FIG. 5) and/or confirming the application of points to activate the quest through a separate window or graphical user interface (not shown). Once unlocked, tracking window 505 may provide progress information through bars 507a, 507b, and 507c corresponding to the three activities of the quest. In the example of FIG. 5, the three activities are earning 50 points on Alpha Task A, B, or C, earning 50 points on Game Beta, and earning 50 points on Game Gamma. Each bar is updated to display the percentage of the progress toward completing each activity. For example, each bar may be colored or filled to display the percentage of the progress of the quest (e.g., between 0% to 100%). Tracking window 505 may also include a point information 509a, 509b, and 509c which are updated to display of how many points have been earned for each activity. With a quest management server, bars 507a, 507b, 507c and point information 509a, 509b, 509c may be updated in real time.

FIG. 6 illustrates an example graphical user interface 600 for entering data to configure a quest, consistent with embodiments of this disclosure. Configuration data for each quest may be stored in or with a quest management server (such as server 202c in FIG. 2 or server 360 in FIG. 3) and used to manage the quest. In some implementations, the quest management server or a supporting server (such as server 202n in FIG. 2) operates the graphical user interface 600, which may be accessed with a computing apparatus or device (e.g., a laptop, personal computer, tablet, or smartphone) of an administrator or operator using a web browser or application that supports communications over a network (e.g., a local area network or the Internet).

As shown in FIG. 6, graphical user interface 600 includes a title 601 (e.g., "Add Quest") indicating that the interface is for adding a quest, input box 603 for entering the name of the quest, selections 605a, 605b, and 605c for choosing a type of activity (e.g., a game activity such as "Points," "Spins" or "Wins"), an input box 607 for inputting the target amount for the activity (e.g., 500 points or 5 wins), day(s) selection 609, location(s) selection 611, a game selection buttons 613 for apply the quest to any game or only selected games, a game selection table 615 for identifying the selected games, next page and previous page buttons 617a, 617b, image upload function 619 for uploading an image for the quest (such as graphic or icon for the quest), an add confirmation button 621, and a cancel button 623.

An administrator or other operator may use interface 600 controlled through a quest management server to create a quest. In the gaming example of FIG. 6, selections 605a, 605b, and 605c provide different types of game activities for a quest (e.g., "Points," "Spins" or "Wins") for an administrator to choose from. For example, when points type 605a is selected, the quest requires the user to earn a specific amount of points to win the reward. The specific amount of required points may be set by entering a value in input box 607. For example, if points type 605a is selected and 100 is entered in input box 607, then the quest requires the user to earn 100 points to win the reward. Game selection icon 613 enables an administrator to apply the quest to all available games or just selected games. For example, if "Select Games" icon is chosen, the administrator may select certain games to apply to the quest. Game selection table 615 enables an administrator to view all available games and select those that will apply to the quest (e.g., by clicking the first column for each selected game). The administrator may navigate and view all available games by clicking next page button 617a and previous page button 617b. The administrator may also jump to a certain page in the list of available games by using page selection function 617c. The administrator may also determine how many game results he wants to view per page on game selection table 615. Additionally and alternatively, the administrator may run a search on game selection table 615 to view specific games. For example, a search function may be provided to enable the administrator to search a specific game by one or more parameters (e.g., Icon, ID, Casino ID, and/or Name). An administrator may also upload an image for the quest using image upload function 619.

Day selection 609 enables an administrator to offer a quest to the users on certain day(s) of the week. For example, the quest may only be offered and played on Mondays ("Mon") and Wednesdays ("Wed") of the week while the quest is valid (e.g., during a defined promotion period). Location selection 611 enables an administrator to define one or more location(s) where the quest may be played. For example, the quest may only be offered for games played at casinos in certain buildings or locations (e.g., "WCA" and "WCW").

Figure 7:
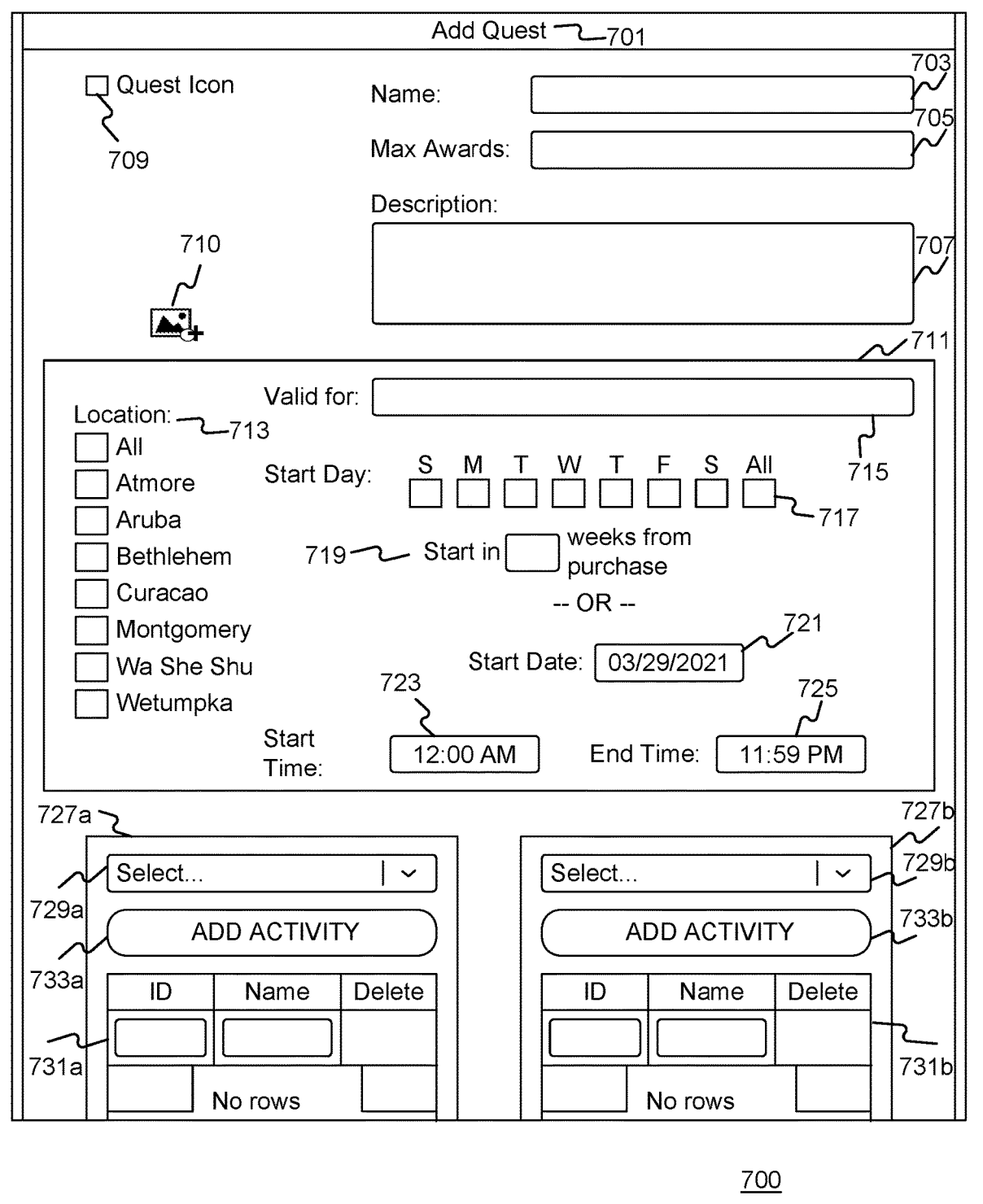

FIG. 7 illustrates another example graphical user interface 700 for entering data to configure a quest, consistent with embodiments of this disclosure. As previously noted, configuration data for each quest may be stored in a quest management server (such as server 202c in FIG. 2 or server 360 in FIG. 3) and used to manage the quest. In some implementations, the quest management server or a supporting server (such as server 202n in FIG. 2) operates the graphical user interface 700, which may be accessed with a computing apparatus or device (e.g., a laptop, personal computer, tablet, or smartphone) of an administrator or operator using a web browser or application that supports communications over a network (e.g., a local area network or the Internet).

As shown in FIG. 7, graphical user interface 700 includes a title 701 (e.g., "Add Quest") indicating that the interface is for adding a quest, an input box 703 for entering the name of the quest, and an input box 705 for identifying the maximum number of rewards to be issued to users for completing the quest. There is also an input box 707 for entering a description of the quest, a quest icon box 709 to provide an icon associated with the quest, and an image upload function 710 for uploading an image for the quest (such as graphic or icon for the quest). As part of the description provided in input box 707, an administrator or operator may describe the details for the quest, including the activities and reward associated with the quest.

Graphical user interface 700 further includes time and location panel 711. Through panel 711, an administrator or operator may set configuration data for the quest, including where and when and/or how long the quest will be offered. As shown in FIG. 7, panel 711 includes a location selection 713 for selecting one or more physical locations for the quest, an input box 715 for setting how long a quest offer will last (e.g., from a start time or date), a day selection 717 for scheduling when the quest is offered, an input box 719 for setting a time for a quest to start after purchase (e.g., no. of weeks from purchase) or a date selection 721 for selecting a start date for the quest. The panel may also include a start time 723 and an end time 725 for entering the start time and end time for the quest.

Location selection 713 may provide multiple location options for an administrator to select from. As previously noted, the location(s) for performing activities related to the quest may be a physical location and/or an online or virtual location. For example, an administrator may configure a quest for activities performed at a casino, hotel, restaurant, and/or other locations. For instance, the selected locations for a quest may be in "Atmore" and "Aruba."

As noted above, input box 715 enables an administrator to set a period of time that a quest offer will be valid. For example, an administrator may make a quest valid for 30 days or one month by inputting 30 days or one month in input box 715. As a further example, an administrator may make a quest valid for a shorter period of time such as 48 hours and input 48 hours into box 715. Day selection 717 enables an administrator to schedule one or more day(s) a quest will be offered to users. For example, when "M" box and "W" box are checked, a quest will be offered to users every Monday and Wednesday while the quest is valid (e.g., during a promotion period). Input box 719 enables an administrator to set a start time for a quest to begin after the quest is activated or purchased. For example, an administrator may configure the quest to start 1 week from purchase by entering "1" into input box 719. Alternatively, an administrator may use date selection 721 to set a specific date for a quest to start. An administrator may also set a specific start time and end time by using start time 723 and end time 725 input fields.

As illustrated in FIG. 7, graphical user interface 700 may include one or more activity selection panels 727a and 727b. An administrator may use activity selection panels 727a and 727b to design a set of activities for the quest. Each quest may include one or more activities. In some implementations, there may be one activity selection panel for each type of activity (e.g., a game activity selection panel; a lodging activity selection panel; a food and beverage activity selection panel; an entertainment activity selection panel; and so on). In other implementations, there may be one activity selection panel through which all activities for a quest are configured. Each activity selection panel may enable an administrator to design and select the activities to be associated with a quest. All available activities (by type or otherwise) may be indexed and searchable through the activity selection panel(s). For example, activity selection panel 727a may be provided to select game activities. Activity selection panel 727a includes a selection field 729a, an activity table 731a, and a confirmation button 733a. An administrator may use selection field 729a to search (e.g., via a drop down window or keyword search) and choose each game or other activity for the quest. An administrator may also use activity table 731a to view the game or other activities that have been added to a quest and make modifications (e.g., deleting a game activity from the set of activities for a quest). As a further example, activity selection panel 727b may be provided to select other activities (e.g., lodging or entertainment activities). Activity selection panel 727b includes a selection field 729b, an activity table 731b, and a confirmation button 733b. An administrator may choose a lodging or entertainment activity for the quest with selection field 729b. An administrator may choose to add or delete activities from the quest using activity table 731b and/or confirmation button 733b.

Figure 8:
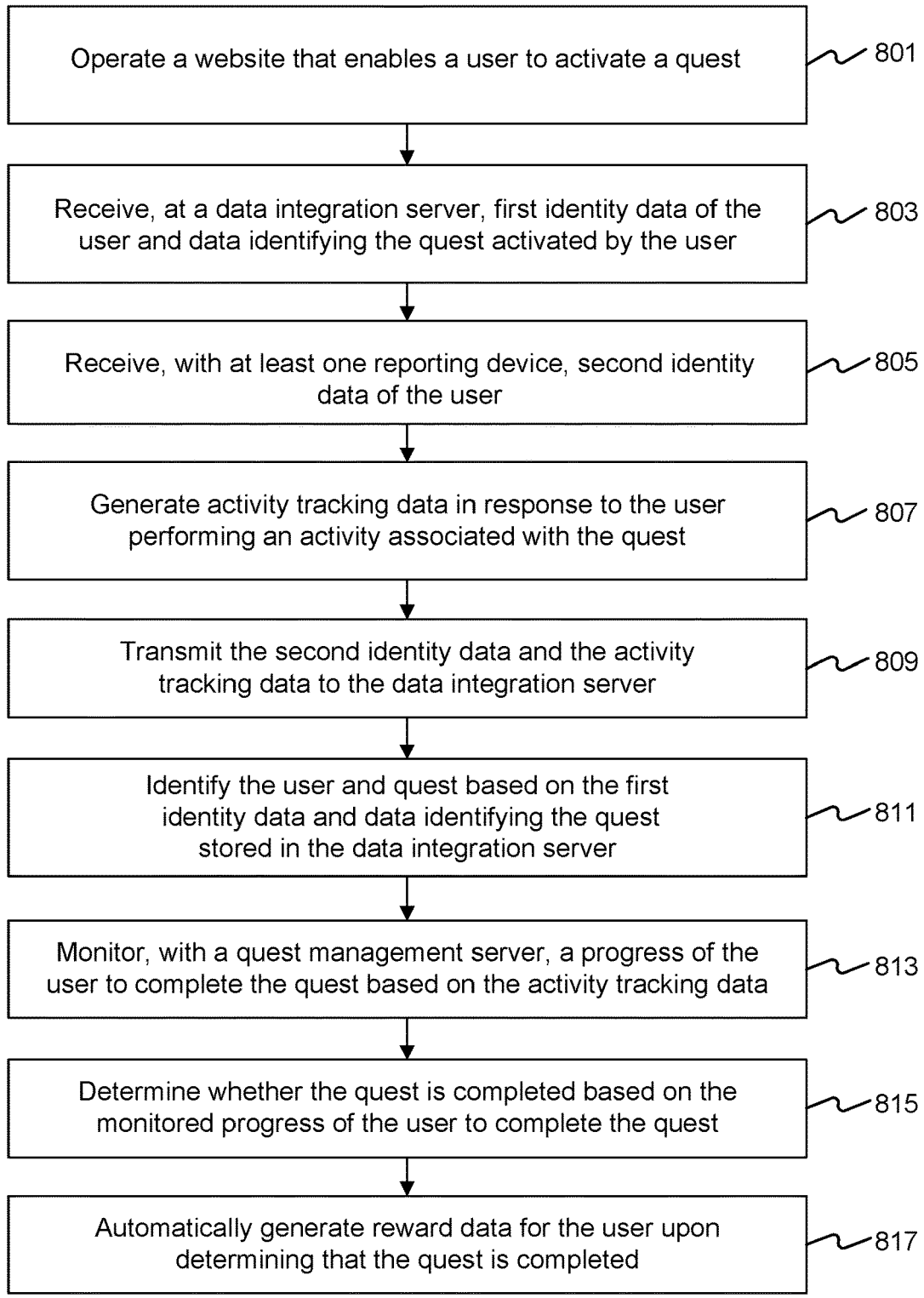
FIG. 8 is a flowchart of an example method for tracking user activity and managing quests, consistent with embodiments of this disclosure.

FIG. 8 is a flowchart illustrating an example method for tracking user activity and managing quests, consistent with embodiments of this disclosure. The method of FIG. 8 may be implemented with any of the herein disclosed computing apparatus and systems for tracking user activity and managing quests (see, e.g., FIGS. 1-3). In some implementations, method 800 is performed by a computer-implemented system, including a website server, a data integration server, one or more reporting devices, and a quest management server. The respective steps and operations of these components for method 800 are described below. It will be appreciated that the components and operations may be combined or modified depending on the application and system implementation.

As shown in FIG. 8, the steps of the method 800 include: operating a website that enables a user to activate a quest (step 801), receiving at a data integration server first identity data representing an identity of the user and data identifying the quest activated by the user (step 803), receiving from at least one reporting device second identity data representing the identity of the user (step 805), generating activity tracking data in response to the user performing an activity associated with the quest (step 807), transmitting the second identity data and the activity tracking data to the data integration server (step 809), identifying the user and quest based on the first identity data and data identifying the quest stored in the data integration server (step 811), monitoring with a quest management server a progress of the user to complete the quest based on the activity tracking data (step 813), determining whether the quest is completed based on the monitored progress of the user to complete the quest (step 815), and automatically generating reward data for the user upon determining that the quest is completed by the user (step 817).

In step 801, a website server may operate a website that enables a user to activate a quest. As previously described, a quest may be activated by, for example, applying points obtained by the user. The points may comprise loyalty points earned by the user and/or the points may be obtained through playing one or more online games executed through the website. In some implementations, a user may obtain points through performing other activities or quests, or the user may purchase the points or the quest directly. The website server may control operations of the website, including the rendering of webpages and/or graphical user interfaces through which a user may review a quest offer and activate the quest by applying their points or completing a purchase transaction.

The website server may be communicatively connected to a data integration server to exchange data. In step 803, the website server may transmit to the data integration server first identity data representing an identity of the user and data identifying the quest activated by the user. The data may be transmitted in response to the user activating the quest or the data may be sent periodically or in batches (e.g., with other user identity data and quest data) to the data integration server. The first identity data may include a username and/or account number of the user or other data identify a user such as a name, membership ID, and/or loyalty account number. The data identifying the quest activated by the user may include a name and/or control number. As part of step 803, upon receiving the first identity data and data identifying the quest, the data integration server may store the data for later retrieval and processing. In some implementations, the first identity data and data identifying the quest may be stored in a user's account record in memory or stored in a database (e.g., a relational or multi-dimensional database) and/or linked to the user's account record.

In step 805, a reporting device may receive second identity data representing the identity of the user at a physical location. In some implementations, the reporting device may identify the user at the physical location either by way of manually entry of data, the scanning of data, or by other conventional methods. The reporting devices may include or be connected to one or more monitors, displays, detectors, readers, scanners, sensors, cameras, point of sales (POS) terminals, an electronic gaming machine (EGM), a reservations terminal, a website, and/or any other devices or components that can identify the user. For example, a user may show or scan their membership card to a reader or scanner, make a transaction with POS terminal, play a game on an EGM in a casino, or log into a website or reservations system (e.g., using a username and password). Other methods of user identification include facial recognition, fingerprint scan, or manual entry of the user's identity by an operator. The second identity data may include some or all of the same data as the first identity data (e.g., a username and/or account number), or it may include alternate data identifying the user (e.g., a name, a membership ID, and/or loyalty account number).

In step 807, each reporting device may generate activity tracking data associated with the user in response to the user performing an activity associated with the quest. Activity tracking data may include, for example, the activity the user performs or completes, the location where the activity was performed, the date and/or time when the activity was performed, and/or the result of the activity. For example, activity tracking data may include data indicating that the user played one or more games on a casino's EGM in Curacao on a specific data/time. The activity tracking data may also include the outcome of the game played on the EGM (e.g., win, loss, winning score or level achieved, and so on). In this example, the data reporting device is the EGM on which the user played the game. As will be appreciated from this disclosure, these are just examples and other activity tracking data and data reporting devices may be utilized depending on the activity that is performed (e.g., a transaction at a POS terminal, staying at a hotel, attending a show at a theatre, etc.).

In step 809, each reporting device may transmit the second identity data and the activity tracking data to the data integration server. According to some embodiments, each reporting device may be communicatively coupled to the data integration server. In some implementations, the reporting devices may send the second identity data and activity tracking data to an intermediate engine or server that compiles the data and subsequently transmit the data in batches periodically over a network to the data integration server. For efficiency, such an intermediate engine may perform data translation and/or aggregation before the data is sent to the data integration server.

In step 811, the identity of the user and quest activated by the user is identified based on the first identity data and data identifying the quest stored in the data integration server. The data may be processed and compared against a user's account record data and the configuration data for quests. For example, in some implementations, a quest management server may determine which users have activated a quest and which quests have been activated by each user by querying the data stored in the data integration server. Also, the quest management server may also further identify the user and activity data related to the quest based on the second identity data and activity tracking data stored in the data integration server. The quest management server may query the data integration server periodically and set users into a processing queue to monitor each user's progress toward completing the quest that they activated. Additionally or alternatively, the data integration server may send alerts or reports to the quest management server to provide notification of newly activated quests and/or received activity tracking data for users. By identifying users who have activated quests and monitoring their activity tracking data, the quest management server can more efficiently manage quests and determine the allocation of rewards to users that successfully complete a quest. Separate processing queues may be created by the quest management server for each quest. As part of step 811, the quest management server may add users to the processing queues using their identity of the users and the data identifying which quest they have activated or purchase.

In step 813, the quest management server may monitor the progress of each user toward completing the quest based on the received activity tracking data from the reporting devices. As discussed above, the activity tracking data may be stored in the data integration server and the quest management server may periodically (e.g., hourly, daily, etc.) query the data integration server or receive alerts about activity tracking data. The quest management server may apply the configuration data for each quest to monitor the progress of each user. For example, the quest management server may confirm that the completed activity as indicated by the activity tracking data is part of the defined activities of the quest. The completed activity may be logged for each user and the quest management server may determine what portion or percentage of all required activities for the quest have been completed by the user. For example, at a given point in time, it may be determined that a user has completed three out of four required activities for a quest and therefore the quest management server may determine that the user has completed 75% of the required activity for the quest. The monitored progress may be reported to the user through a website or application so that the user can keep track of their progress toward completing the quest.

In step 815, the quest management server may determine whether the quest is completed based on the monitored progress of the user to complete the quest. As indicated above, the quest management server may apply the configuration data and activity tracking data to monitor the progress of each user. As each required activity is completed by a user, it may be logged for that user with respect to the quest that they activated. The quest management server may keep track of what portion or percentage of all required activities for the quest have been completed by the user. For example, as the user's progress is monitored, the quest management server may determine the quest is completed when 100% of all activities in the quest have been completed. If the progress of all activities is below 100%, the quest management server will determine that the quest is not completed and continue to monitor the user's progress and activity tracking data. In some implementations, the monitored progress of the user may be logged in a database associated with the quest management server. Additionally or alternatively, the monitored progress of the user may be stored in a memory of the data integration server or another server. In some implementations, the determined progress of the user is stored with the activity tracking data related to the quest. Such data may be stored in the user's account record or in a separate record linked to or associated with the user's account record.

In step 817, the quest management server may automatically generate reward data for the user when it is determined that the user has completed all activities for the quest. The quest management server may apply one or more rules for confirming that the reward data should be generated. For example, in addition to confirming that all activities were successfully completed, the quest management server may apply other rules based on the configuration data for the quest, such as the stop time or expiration date to make sure the quest was completed within the required time limit and/or a maximum award limit to make sure that the number of users that have received the reward has not been reached. Other rules based on the quest configuration data may be applied such as the location requirement for the activity completed by the user. To generate the reward data, the quest management server may confirm the allotted reward for the quest based on the configuration data and issue the respective reward data for posting to the user's account record, for example. The reward data may also be issued in other forms, such as discounts, coupons, or credits issued to the user in paper or electronic form. By way of example, if the quest has a reward of 500 points and $25 free play, the quest management server will generate reward data for 500 points and $25 free play and then it will be added or stored under the user's account record in memory or a database.

Figure 9:
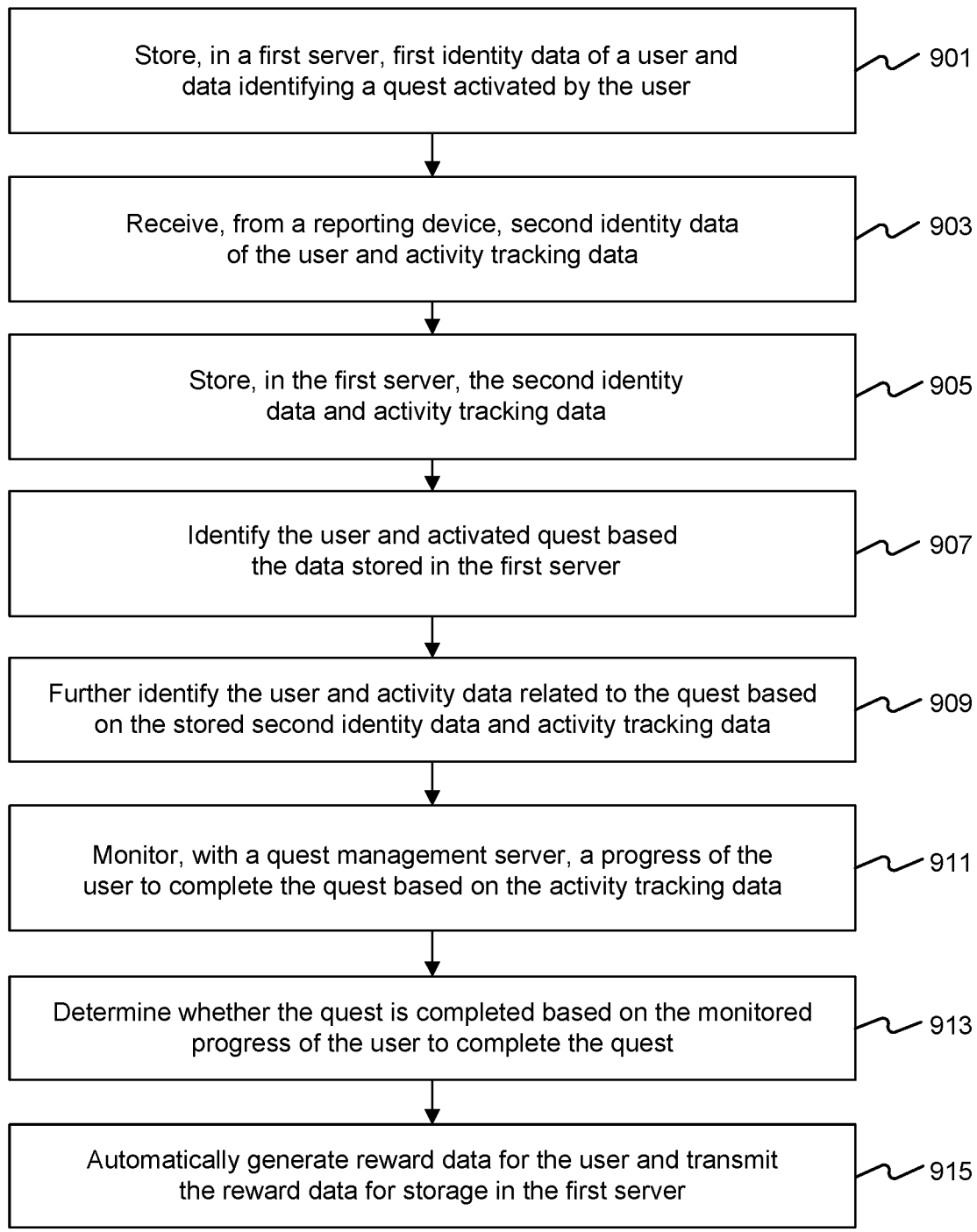
FIG. 9 is a flowchart of another example method for tracking user activity and managing quests, consistent with embodiments of this disclosure.

FIG. 9 is a flowchart illustrating another example method for tracking user activity and managing quests, consistent with embodiments of this disclosure. The method of FIG. 9 may be implemented with any of the herein disclosed computing apparatus and systems for tracking user activity and managing quests (see, e.g., FIGS. 1-3). In some implementations, method 900 is performed by a computer-implemented system with one or more servers and one or more reporting devices. The respective steps and operations of these components for method 900 are described below. It will be appreciated that the components and operations may be combined or modified depending on the application and system implementation.

As shown in FIG. 9, the steps of the method 900 include: a storing, in a first server, first identity data representing an identity of the user and data identifying the a quest activated by the user (step 901), receiving, from at least one reporting device, second identity data and activity tracking data (step 903), storing, in the first server, the second identity data and activity tracking data (step 905), identifying the user and activated quest based on the data stored in the first server (step 907), further identifying the user and activity data related to the quest based on the stored second identity data and activity tracking data (step 909), monitoring, with a quest management server, a progress of the user to complete the quest based on the activity tracking data (step 911), determining whether the quest is completed based on the monitored progress of the user to complete the quest (step 913), and when it is determined that the quest is completed, automatically generating reward data associated with the quest for the user and transmitting the reward data for storage in the first server (step 915).

In step 901, a first server may store first identity data of a user and data identifying a quest activated by the user. The first server may be a data integration server or a supporting server. In some implementations, the first server is a website server. As described above, a website server may operate a website that enables a user to activate a quest. A quest may be activated by, for example, applying points obtained by the user. The points may represent loyalty points earned by the user and/or the points may be obtained through playing one or more online games executed through the website. In some implementations, a user may obtain points through performing other activities or quests, or the user may purchase the points or the quest directly. The website server may control operations of the website, including the rendering of webpages or graphical user interfaces through which a user may review a quest offer and activate the quest by applying their points or completing a purchase transaction. If the first server is separate from website server (e.g., the first server is a data integration server or a supporting server), the first identity data and data identifying the quest may be transmitted by the website server to the first server. According to some implementations, when a user activates a quest at the website, the website server may store the data or transmit the first identity data and data identifying the quest to another server for storage.

In steps 903 and 905, second identity data for the user and activity tracking data may be received and stored. As noted above, one or more reporting devices may be provided at physical locations and configured to receive or generate second identity data representing the identity of the user. The reporting devices may include or be connected to one or more monitors, displays, detectors, readers, scanners, sensors, cameras, point of sales (POS) terminals, an electronic gaming machine (EGM), a reservations terminal, a website, and/or any other devices or components that can identify the user. For example, a user may show or scan their membership card to a reader or scanner, make a transaction with POS terminal, play a game on an EGM in a casino, or log into a website or reservations system (e.g., using a username and password). Other methods of user identification include facial recognition, fingerprint scan, or manual entry of the user's identity by an operator. The second identity data may include some or all of the same data as the first identity data (e.g., a username and/or account number), or it may include alternate data identifying the user (e.g., a name, a membership ID, and/or loyalty account number). Each reporting device may generate activity tracking data associated with the user in response to the user performing an activity associated with the quest. Activity tracking data may include, for example, the activity the user performs or completes, the location where the activity was performed, the date and/or time when the activity was performed, and/or the result of the activity. For example, activity tracking data may include data indicating that user played one or more games on a casino's EGM in Curacao on a specific data/time. Other activity tracking data and data reporting devices may be utilized depending on the activity that is performed (e.g., a transaction at a POS terminal, staying at a hotel, attending a show at a theatre, etc.).

The second identity data and activity tracking data may be received by and stored in the first server. Each reporting device may transmit the second identity data and activity tracking data to the first server for storage. As noted above, the first server may be a website server, a data integration server, or a supporting server that provides one or more operations. Each reporting device may be communicatively coupled to the first server. In some implementations, the reporting devices may send the second identity data and activity tracking data to an intermediate engine or server that compiles the data and subsequently transmit the data in batches periodically over a network to the first server. Alternatively, such operations may be performed by a supporting server that operates alone or in coordination with a data integration server.

In steps 907 and 908, the identity of the user and activated quest may be identified based on the stored data in the first server, and further the identity of the user and activity data related to the quest may be identified by the other data stored in the first server. These steps may be performed by a quest management server and/or a supporting server querying and reviewing the data stored in the first server. For example, the identity of the user and quest activated by the user may be identified based on the first identity data and data identifying the quest stored in the first server. The data may be processed and compared against a user's account record data and the configuration data for quests. In some implementations, the quest management server may determine which users have activated a quest and which quests have been activated by each user by querying the data stored in the first server. Also, the quest management server may also further identify the user and activity data related to the quest based on the second identity data and activity tracking data stored in the first server. The quest management server may query the first server periodically and set users into a processing queue to monitor each user's progress toward completing the quest that they activated. Additionally or alternatively, the first server or a supporting server may send alerts or reports to the quest management server to provide notification of newly activated quests and/or received activity tracking data for users. By identifying users who have activated quests and monitoring their activity tracking data, the quest management server can more efficiently manage quests and determine the allocation of rewards to users that successfully complete a quest.

In step 911, the quest management server may monitor the progress of each user toward completing the quest based on the received activity tracking data from the reporting devices. As discussed above, the activity tracking data may be stored in the first server and the quest management server may periodically (e.g., hourly, daily, etc.) query the first server or receive alerts about activity tracking data. The quest management server may apply the configuration data for each quest to monitor the progress of each user. For example, the quest management server may confirm that the completed activity as indicated by the activity tracking data is part of the defined activities of the quest. The completed activity may be logged for each user and the quest management server may determine what portion or percentage of all required activities for the quest have been completed by the user. The monitored progress may be reported to the user through a website or application so that the user can keep track of their progress toward completing the quest.

In step 913, the quest management server may determine whether the quest is completed based on the monitored progress of the user to complete the quest. As indicated above, the quest management server may apply the configuration data and activity tracking data to monitor the progress of each user. As each required activity is completed by a user, it may be logged for that user with respect to the quest that they activated. The quest management server may keep track of what portion or percentage of all required activities for the quest have been completed by the user. For example, as the user's progress is monitored, the quest management server may determine the quest is completed when 100% of all activities in the quest have been completed. If the progress of all activities is below 100%, the quest management sever will determine that the quest is not completed and continue to monitor the user's progress and active tracking data. In some implementations, the monitored progress of the user may be logged in a database associated with the quest management server. Additionally or alternatively, the monitored progress of the user may be stored in a memory of the data integration server or another sever.

In step 915, the quest management server may automatically generate reward data for the user when it is determined that the user has completed all activities for the quest. The quest management server may apply one or more rules for confirming that the reward data should be generated. For example, in addition to confirming that all activities were successfully completed, the quest management server may apply other rules based on the configuration data for the quest, such as the stop time or expiration date to make sure the quest was completed within the required time limit and/or a maximum award limit to make sure that the number of users that have received the reward has not been reached. Other rules based on the quest configuration data (such as location data) may be applied to determine if the quest is successfully completed. As noted above, the reward data may be issued in various forms consistent with the configuration data for the quest. In some implementations, the reward data representing the reward may be added or stored under the user's account record in memory or a database.

Embodiment of the present disclosure may be implemented through any suitable combination of hardware, software, and/or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory. Examples of networks for supporting the herein described connections and communication of data feeds and information include private and public networks, including intranets, local area networks, and wide area networks (including the Internet). Such networks may include any combination of wired and wireless networks and support associated communication protocols.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above-described embodiments can be implemented by hardware, or software (program codes), or a combination of hardware and software. If implemented by software, it may be stored in the above-described non-transitory computer-readable media. The software, when executed by the processor can perform the disclosed methods. The computing units and other functional units described in this disclosure can be implemented by hardware, or software, or a combination of hardware and software. One of ordinary skill in the art will also understand that the above-described servers may be combined as one server, and each of the above-described servers may be further divided into a plurality of sub-servers. For example, there may be a single physical computer for the data integration server, the website server, and the quest management server.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the implementations disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

By way of example, embodiments of the present disclosure include a computer-implemented system for tracking user activity and managing quests. The system may include a first server, a second server communicatively coupled to the first server, and a quest management server communicatively coupled to the first server. The first server may be configured to: store first identity data representing an identity of a user and data identifying a quest activated by the user, the quest being activated online by the user and comprising one or more activities to be performed at a physical location; receive, from at least one reporting device, second identity data representing the identity of the user at the physical location and activity tracking data in response to the user performing an activity associated with the quest at the physical location; and store the second identity data and the activity tracking data to the first server. The second server communicatively coupled to the first server may be configured to: identify the user based on the first identity data or the second identity data in response to receiving the first identity data or the second identity data from the first server; and transmit the second identity data and additional activity tracking data to the first server for storage. The quest management server communicatively coupled to the first server may be configured to: identify the user and quest activated by the user based on the first identity data and data identifying the quest stored in the first server; further identify the user and activity data related to the quest based on the second identity data and activity tracking data stored in the first server; monitor a progress of the user to complete the quest based on the activity tracking data stored in the first server; determine whether the quest is completed based on the monitored progress of the user to complete the quest; and upon determining that the quest is completed, automatically generate reward data for the user and transmit the reward data to the first server. In some embodiments, the quest may further comprise one or more activities to be performed online.

What is claimed is:

1. A computer-implemented system for tracking user activity and managing quests, the system comprising:
   a website server configured to operate a website that enables a user to activate a quest, the quest comprising one or more activities to be performed at one or more physical locations;
   a data integration server communicatively coupled to the website server, the data integration server including one or more data collection engines for translating or configuring data into a common or destination data format or protocol, and wherein the data integration server is configured to receive, from the website server, first identity data representing an identity of the user and data identifying the quest activated by the user, translate or configure the first identity data and the data identifying the quest activated by the user into the common or destination data format or protocol, and store the translated or configured first identity data and the data identifying the quest activated by the user;
   a plurality of reporting devices located at different locations of the one or more physical locations, each reporting device being communicatively coupled to the data integration server, and each reporting device being configured to:
      receive second identity data representing the identity of the user at a particular physical location, at least a portion of the second identity data being in a different data format than the first identity data,
      generate activity tracking data in response to the user performing an activity associated with the quest at the particular physical location, and
      transmit the second identity data and the activity tracking data to the data integration server, the data integration server being further configured to translate or configure the second identity data and the activity tracking data into the common destination data format or protocol and store the translated or configured second identity data and activity tracking data transmitted from each reporting device; and
   a quest management server communicatively coupled to the data integration server and configured to:
      identify the user and quest activated by the user based on the translated or configured first identity data and data identifying the quest stored in the data integration server,
      further identify the user and activity data related to the quest based on the translated or configured second identity data and activity tracking data stored in the data integration server,
      monitor a progress of the user to complete the quest based on the translated or configured activity tracking data stored in the data integration server and configuration data identifying the one or more activities to be performed for completing the quest,
      determine whether the quest is completed based on the monitored progress of the user to complete the quest, and
      upon determining that the quest is completed, automatically generate reward data for the user and transmit the reward data to the data integration server.

2. The system of claim 1, wherein the quest further comprises one or more activities to be performed online.

3. The system of claim 1, wherein the website server is further configured to enable the user to activate the quest by at least one of applying a payment or using points obtained by the user playing at least one online game executed through the website.

4. The system of claim 3, wherein the plurality of reporting devices comprise two or more of an electronic gaming machine, a server, a smartphone, a point of sale device, a bar code reader, a magnetic card reader, a contactless chip detector, a biometric reader, a video camera, a geo-location detector, and a beacon reader.

5. The system of claim 1, wherein each reporting device is further configured to:
   transmit the second identity data and activity tracking data to the data integration server each time the identity of the user is validated and the user completes a particular activity related to the quest.

6. The system of claim 1, wherein the quest management server is further configured to:
   aggregate the translated or configured second identity data and activity tracking data stored in the data integration server; and
   monitor the progress of the user to complete the quest based on the aggregated translated or configured second identity data and activity tracking data, and the configuration data identifying the one or more activities to be performed for completing the quest.

7. The system of claim 1, wherein the data integration server is further configured to:
   associate and store the translated or configured first identity data, the translated or configured data identifying the quest, the translated or configured second identity data, and the translated or configured activity tracking data.

8. The system of claim 1, wherein the data integration server is further configured to:
   periodically transmit, to the quest management server, the translated or configured second identity data and activity tracking data.

9. The system of claim 1, wherein each reporting device is further configured to:
   validate the identity of the user; and
   transmit the second identity data to the data integration server in response to validating the identity of the user.

10. The system of claim 1, wherein the quest management server is further configured to:
    transmit a poll request to the data integration server to obtain one or more of the translated or configured first identity data, the translated or configured second identity data, and the translated or configured activity data from the data integration server.

11. The system of claim 1, wherein the one or more physical locations comprises at least one of a casino, a hotel or other lodging facility, an entertainment facility, a food or beverage facility, and a retail store.

12. The system of claim 1, wherein the one or more activities associated with the quest comprise at least one of visiting the particular physical location, staying at the particular physical location a predetermined amount of time, playing a game, achieving a designated achievement in the game, conducting a transaction, or interacting with a designated individual.

13. The system of claim 1, wherein the reward data identifies at least one of a cash reward, a voucher reward, a point reward, an achievement-type reward, or a discount reward.

14. The system of claim 1, wherein the configuration data identifying the one or more activities to be performed for completing the quest further includes expiration data representing at least one of a start date or an expiration date for completing the quest, and the quest management server is further configured to:
  determine whether the quest is completed on or before the expiration date based on the monitored progress of the user to complete the quest.

15. The system of claim 1, wherein the quest management server is further configured to:
  generate data for displaying the monitored progress of the user to complete the quest; and
  further generate data, upon determining that the quest is completed, for displaying the reward data for the user.

16. The system of claim 1, wherein the quest management server is further configured to:
  provide an interface to receive the configuration data for configuring each quest; and
  transmit at least a portion of the configuration data to the website server.

17. The system of claim 1, wherein the website server is further configured to operate the website that enables a plurality of users to play one or more online games and obtain credits to activate one or more quests, each quest being associated with a plurality of activities to be performed at the one or more physical locations.

18. A computer-implemented method for tracking user activity and managing quests, the method comprising the following steps performed by at least one processor:
  receiving, at a data integration server, from a website server, the data integration server being communicatively coupled to the website server, first identity data representing an identity of a user and data identifying a quest activated by the user, the quest comprising one or more activities to be performed at one or more physical locations;
  receiving, at the data integration server, from a plurality of reporting devices located at different locations of the one or more physical locations, each reporting device being communicatively coupled to the data integration server, second identity data representing the identity of the user at the one or more physical locations, and activity tracking data in response to the user performing an activity associated with the quest at the one or more physical locations, wherein at least a portion of the second identity data is in a different data format than the first identity data;
  translating or configuring, using one or more data collection engines in the data integration server, the first identity data and the second identity data into a common or destination data format or protocol;
  identifying, using a quest management server communicatively coupled to the data integration server, the user and the quest activated by the user based on the translated or configured first identity data and data identifying the quest;
  further identifying, using the quest management server, the user and activity data related to the quest based on the translated or configured second identity data and activity tracking data;
  monitoring, using the quest management server, a progress of the user to complete the quest based on the translated or configured activity tracking data and configuration data identifying the one or more activities to be performed for completing the quest;
  determining, using the quest management server, whether the quest is completed based on the monitored progress of the user to complete the quest; and
  upon determining that the quest is completed, automatically generating, using the quest management server, reward data for the user and transmitting the reward data to a server for storage.

19. The system of claim 18, wherein the quest further comprises one or more activities to be performed online.

20. The method of claim 18, wherein at least one processor is further configured for enabling the user to activate the quest by at least one of applying a payment or using points obtained by the user playing at least one online game executed through a website.

21. The method of claim 20, wherein the plurality of reporting devices comprise two or more of an electronic gaming machine, a server, a smartphone, a point of sale device, a bar code reader, a magnetic card reader, a contactless chip detector, a biometric reader, a video camera, a geo-location detector, and a beacon reader.

22. The method of claim 18, wherein the steps performed by the at least one processor further include:
  receiving, at the data integration server, from each reporting device, the second identity data and activity tracking data each time the identity of the user is validated and the user completes a particular activity related to the quest.

23. The method of claim 22, wherein the steps performed by the at least one processor further include:
  aggregating the translated or configured second identity data and activity tracking data; and
  monitoring the progress of the user to complete the quest based on the aggregated translated or configured second identity data and activity tracking data, and the configuration data identifying the one or more activities to be performed for completing the quest.

24. The method of claim 18, wherein the steps performed by the at least one processor further include:
  associating and storing the translated or configured first identity data, the translated or configured data identifying the quest, the translated or configured second identity data, and the translated or configured activity tracking data.

25. The method of claim 18, wherein the one or more physical locations comprises at least one of a casino, a hotel or other lodging facility, an entertainment facility, a food or beverage facility, and a retail store.

26. The method of claim 18, wherein the one or more activities associated with the quest comprise at least one of visiting the particular physical location, staying at the particular physical location a predetermined amount of time, playing a game, achieving a designated achievement in the game, conducting a transaction, or interacting with a designated individual.

27. The method of claim 18, wherein the reward data identifies at least one of a cash reward, a voucher reward, a point reward, or a discount reward.

28. The method of claim 18, wherein the configuration data identifying one or more activities to be performed for completing the quest further includes expiration data representing at least one of a start date or an expiration date for completing the quest.

29. The method of claim 28, wherein the steps performed by the at least one processor further include:
  determining whether the quest is completed on or before the expiration date based on the monitored progress of the user of complete the quest.

30. The method of claim 18, wherein the steps performed by the at least one processor further include:

generating data for displaying the monitored progress of the user to complete the quest; and further generating data, upon determining that the quest is completed, for displaying the reward data for the user.

31. The method of claim 18, wherein the steps performed by the at least one processor further include:

providing an interface to receive the configuration data for configuring each quest; and transmitting at least a portion of the configuration data to the website server.

\* \* \* \* \*